United States Patent
Zhang et al.

(10) Patent No.: US 11,924,766 B2
(45) Date of Patent: *Mar. 5, 2024

(54) POWER SAVING IN NEW RADIO MULTICAST

(71) Applicant: QUALCOMM Incorporated, San Diego, CA (US)

(72) Inventors: Xiaoxia Zhang, San Diego, CA (US); Jing Sun, San Diego, CA (US); Le Liu, San Jose, CA (US); Alberto Rico Alvarino, San Diego, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,866

(22) Filed: Dec. 15, 2022

(65) Prior Publication Data

US 2023/0124759 A1    Apr. 20, 2023

Related U.S. Application Data

(63) Continuation of application No. 17/086,062, filed on Oct. 30, 2020, now Pat. No. 11,558,820.

(Continued)

(51) Int. Cl.
*H04W 52/02* (2009.01)
*H04B 7/0413* (2017.01)
(Continued)

(52) U.S. Cl.
CPC ...... *H04W 52/0261* (2013.01); *H04B 7/0413* (2013.01); *H04W 76/15* (2018.02); *H04W 88/02* (2013.01)

(58) Field of Classification Search
CPC . H04W 76/15; H04W 52/0261; H04B 7/0413
(Continued)

(56) References Cited

U.S. PATENT DOCUMENTS

| 8,441,913 B2 | 5/2013 | Li et al. |
| 2009/0070841 A1* | 3/2009 | Buga ............ H04B 7/18506 725/116 |

(Continued)

FOREIGN PATENT DOCUMENTS

| CN | 1864379 A | 11/2006 |
| CN | 102497619 A | 6/2012 |

(Continued)

OTHER PUBLICATIONS

English of CN110476386 (Year: 2018).*
(Continued)

*Primary Examiner* — Ted M Wang
(74) *Attorney, Agent, or Firm* — Holland & Hart LLP

(57) ABSTRACT

Methods, systems, and devices for wireless communications are described. A method for wireless communication at a user equipment (UE) may include: receiving a multicast bandwidth part configuration for multicast communications between a base station and the UE, where the multicast bandwidth part configuration includes a maximum number of multiple-input, multiple-output layers to be used for the multicast communications; establishing a multicast link with the base station for multicast communications; determining to use a reduced number of antennas for multicast reception than the number of antennas used for unicast reception, or determining that the UE is able to decode the multicast communications prior to a remaining portion of the multicast communications; and receiving the multicast communications via the reduced number of antennas, or reducing the radio frequency power prior to completion of a number (Continued)

of repetitions or retransmissions of the multicast communications.

30 Claims, 22 Drawing Sheets

Related U.S. Application Data

(60) Provisional application No. 62/930,653, filed on Nov. 5, 2019.

(51) Int. Cl.
*H04W 76/15* (2018.01)
*H04W 88/02* (2009.01)

(58) Field of Classification Search
USPC ........................................................ 455/574
See application file for complete search history.

(56) References Cited

U.S. PATENT DOCUMENTS

| | | |
|---|---|---|
| 2013/0094422 A1 | 4/2013 | Thanikachalam |
| 2017/0093474 A1 | 3/2017 | Lee et al. |
| 2019/0253966 A1 | 8/2019 | Park et al. |
| 2019/0313437 A1 | 10/2019 | Jung et al. |
| 2019/0357292 A1 | 11/2019 | Cirik et al. |
| 2020/0252990 A1 | 8/2020 | Ganesan et al. |
| 2021/0136693 A1 | 5/2021 | Zhang et al. |

FOREIGN PATENT DOCUMENTS

| | | | |
|---|---|---|---|
| CN | 107210792 A | | 9/2017 |
| CN | 110476386 A | * | 3/2018 |
| CN | 109121187 A | | 1/2019 |
| WO | WO-2007038694 A1 | | 4/2007 |
| WO | WO-2018009137 A1 | | 1/2018 |
| WO | WO-2018174510 A1 | | 9/2018 |

OTHER PUBLICATIONS

"IEEE P802.20TM/D4.0m Draft Standard for Local and Metropolitan Area Networks—Standard Air Interface for Mobile Broadband Wireless Access Systems Supporting Vehicular Mobility—Physical and Media Access Control Layer Specification", IEEE, Piscataway, NJ, USA, Feb. 29, 2008 (Feb. 29, 2008), XP040393795, 1312 Pages.

International Search Report and Written Opinion—PCT/US2020/058568—ISA/EPO—dated Feb. 25, 2021.

International Preliminary Report on Patentability—PCT/US2020/058568 The International Bureau of WIPO—Geneva, Switzerland, May 19, 2022 (200159WO).

Weiyan G.E., et al., "A Cross-Layer Design Approach to Multi cast in Wireless Networks", IEEE Transactions on Wireless Communications, IEEE Service Center, Piscataway, NJ, US, vol. 6, No. 3, Mar. 1, 2007 (Mar. 1, 2007), pp. 1063-1071, XP011175206, ISSN: 1536-1276, DOI: 10.1109/TWC.2007.05468 abstract col. 1-col. 3, 9 Pages.

* cited by examiner

POWER SAVING IN NEW RADIO MULTICAST

CROSS REFERENCE

The present application for patent is a Continuation of U.S. patent application Ser. No. 17/086,062 by ZHANG et al., entitled, "POWER SAVING IN NEW RADIO MULTICAST" filed Oct. 30, 2020, which claims the benefit of U.S. Provisional Patent Application No. 62/930,653 by ZHANG et al., entitled "POWER SAVING IN NEW RADIO MULTICAST," filed Nov. 5, 2019, each of which are assigned to the assignee hereof, and each of which are expressly incorporated by reference herein.

FIELD OF TECHNOLOGY

The following relates generally to wireless communications and more specifically to power saving in new radio multicast.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some radio access technologies (RATs) may support multicast communications, in which data is transmitted in a single multicast communication from a base station to multiple UEs subscribed to the multicast service. The group of UEs subscribed to the multicast service may be geographically spread out in the coverage area of the base station. Thus, each UE of the group of UEs may have a different geometry with the base station that may result in each UE experiencing different signal quality levels with the base station. The base station may account for the variance in the signal qualities of the UEs when configuring multicast transmissions. In some cases, a UE may have good geometry and signal quality with the base station, but the base station may nevertheless configure the group multicast transmissions to account for one or more UEs with low signal quality or poor geometry. Accordingly, the UE with good signal quality may expend unnecessary power when receiving the multicast transmission due to the multicast configuration including enough resources for a lower signal quality than that of the good geometry UE.

SUMMARY

The described techniques relate to improved methods, systems, devices, and apparatuses that support power saving in new radio multicast. Generally, the described techniques provide for user equipment (UE) power saving for multicast transmissions when the UE is in good geometry relative to the base station. For instance, UEs with high link quality relative to the link quality for the group of UEs receiving a multicast transmission may reduce power consumption by reducing the number of receive antennas used or the number of decoding attempts during multicast reception. In some cases, a base station may provide assistance information that includes assistance metrics to aid the UE in reducing the number of antennas used or the number of decoding attempts during multicast reception, or both, resulting in greater power saving.

A method of wireless communications at a UE is described. The method may include receiving a multicast bandwidth part configuration for multicast communications between a base station and the UE, where the multicast bandwidth part configuration includes a maximum number of multiple-input, multiple-output layers to be used for the multicast communications, establishing a multicast link with the base station for reception of the multicast communications, determining, based on a link quality of the multicast link, to use a reduced number of antennas for reception of the multicast communications than the number of antennas used for unicast reception, and receiving the multicast communications via the reduced number of antennas.

An apparatus for wireless communications at a UE is described. The apparatus may include a processor, memory coupled with the processor, and instructions stored in the memory. The instructions may be executable by the processor to cause the apparatus to receive a multicast bandwidth part configuration for multicast communications between a base station and the UE, where the multicast bandwidth part configuration includes a maximum number of multiple-input, multiple-output layers to be used for the multicast communications, establish a multicast link with the base station for reception of the multicast communications, determine, based on a link quality of the multicast link, to use a reduced number of antennas for reception of the multicast communications than the number of antennas used for unicast reception, and receive the multicast communications via the reduced number of antennas.

Another apparatus for wireless communications at a UE is described. The apparatus may include means for receiving a multicast bandwidth part configuration for multicast communications between a base station and the UE, where the multicast bandwidth part configuration includes a maximum number of multiple-input, multiple-output layers to be used for the multicast communications, establishing a multicast link with the base station for reception of the multicast communications, determining, based on a link quality of the multicast link, to use a reduced number of antennas for reception of the multicast communications than the number of antennas used for unicast reception, and receiving the multicast communications via the reduced number of antennas.

A non-transitory computer-readable medium storing code for wireless communications at a UE is described. The code may include instructions executable by a processor to receive a multicast bandwidth part configuration for multicast communications between a base station and the UE, where the multicast bandwidth part configuration includes a maximum number of multiple-input, multiple-output layers to be used for the multicast communications, establish a multicast link with the base station for reception of the multicast communications, determine, based on a link quality of the multicast link, to use a reduced number of antennas for reception of the multicast communications than the number of antennas used for unicast reception, and receive the multicast communications via the reduced number of antennas.

In some examples of the method, apparatuses, and non-transitory computer-readable medium described herein, determining to use the reduced number of antennas for reception of the multicast communications than the number of antennas used for unicast reception may include operations, features, means, or instructions for receiving one or more multicast-specific assistance metrics corresponding to the multicast bandwidth part configuration, and determining to use the reduced number of antennas for reception of the multicast communications based on the one or more multicast-specific assistance metrics.

In some examples of the method, apparatuses, and non-transitory computer-readable medium described herein, receiving the one or more multicast-specific assistance metrics may include operations, features, means, or instructions for receiving the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

In some examples of the method, apparatuses, and non-transitory computer-readable medium described herein, the one or more multicast-specific assistance metrics include a maximum target modulation and coding scheme, a minimum physical downlink control channel aggregation level, or a combination thereof.

In some examples of the method, apparatuses, and non-transitory computer-readable medium described herein, the one or more multicast-specific assistance metrics include an allowed modulation and coding scheme range for a time period, an allowed physical downlink control channel aggregation level range for the time period, or a combination thereof.

In some examples of the method, apparatuses, and non-transitory computer-readable medium described herein, the one or more multicast-specific assistance metrics include a signal quality threshold, where the signal quality threshold may be based on a reference signal received power, a reference signal received quality, a layer 1 signal to interference and noise ratio, a channel state information reference signal (CSI-RS) signal to interference and noise ratio, or some combination thereof.

In some examples of the method, apparatuses, and non-transitory computer-readable medium described herein, the one or more multicast-specific assistance metrics include a minimum channel to reference signal measurement ratio.

Some examples of the method, apparatuses, and non-transitory computer-readable medium described herein may further include operations, features, means, or instructions for receiving updated one or more multicast-specific assistance metrics corresponding to the multicast bandwidth part configuration based on a change to the maximum number of multiple-input, multiple-output layers or a multicast data rate to be used for the multicast communications.

Some examples of the method, apparatuses, and non-transitory computer-readable medium described herein may further include operations, features, means, or instructions for transmitting channel state information feedback, where the change to the maximum number of multiple-input, multiple-output layers or a multicast data rate to be used for the multicast communications may be based on the channel state information feedback.

In some examples of the method, apparatuses, and non-transitory computer-readable medium described herein, the change to the maximum number of multiple-input, multiple-output layers or a multicast data rate to be used for the multicast communications may be based on a number of UEs receiving the multicast communications changing.

In some examples of the method, apparatuses, and non-transitory computer-readable medium described herein, the one or more multicast-specific assistance metrics may be associated with the multicast bandwidth part configuration, and where different one or more multicast-specific assistance metrics may be associated with a second multicast bandwidth part configuration.

In some examples of the method, apparatuses, and non-transitory computer-readable medium described herein, establishing the multicast link with the base station for reception of the multicast communications may include operations, features, means, or instructions for switching to the multicast bandwidth part configuration during a group active time period.

Some examples of the method, apparatuses, and non-transitory computer-readable medium described herein may further include operations, features, means, or instructions for receiving a unicast communication contemporaneously with the multicast communications, where the UE uses a consistent modulation and coding scheme and aggregation level between the unicast communication and the multicast communications.

Some examples of the method, apparatuses, and non-transitory computer-readable medium described herein may further include operations, features, means, or instructions for transmitting channel state information feedback associated with the multicast communications received via the reduced number of antennas on first resources that may be separate from second resources identified for transmission of channel state information feedback associated with the multicast communications received at the UE using a number of antennas equal to or greater than the number of antennas used for unicast reception.

Some examples of the method, apparatuses, and non-transitory computer-readable medium described herein may further include operations, features, means, or instructions for determining that the UE may be able to decode the multicast communications prior to completion of a number of repetitions or retransmissions of the multicast communications, and transmitting multicast feedback associated with the multicast communications on opportunistic multicast feedback resources in between slots prior to completion of the number of repetitions or retransmissions based on the determination that the UE may be able to decode the multicast communications prior to completion of the number of repetitions or retransmissions.

Some examples of the method, apparatuses, and non-transitory computer-readable medium described herein may further include operations, features, means, or instructions for determining that the UE may be able to decode the multicast communications prior to completion of a number of repetitions or retransmissions of the multicast communications, and transmitting multicast feedback associated with the multicast communications on unicast feedback resources prior to completion of the number of repetitions or retransmissions based on the determination that the UE may be able to decode the multicast communications.

A method of wireless communications at a base station is described. The method may include transmitting a multicast bandwidth part configuration for multicast communications between the base station and a set of user equipments (UEs), establishing a multicast link with each of the set of UEs for transmissions of the multicast communications, transmitting, to the set of UEs, one or more multicast-specific assistance metrics corresponding to the multicast bandwidth part configuration, where the one or more multicast-specific assistance metrics facilitate UE adjustment of the multicast bandwidth part configuration, and transmitting, to the set of UEs, the multicast communications in accordance with the multicast bandwidth part configuration.

An apparatus for wireless communications at a base station is described. The apparatus may include a processor, memory coupled with the processor, and instructions stored in the memory. The instructions may be executable by the processor to cause the apparatus to transmit a multicast bandwidth part configuration for multicast communications between the base station and a set of user equipments (UEs), establish a multicast link with each of the set of UEs for transmissions of the multicast communications, transmit, to the set of UEs, one or more multicast-specific assistance metrics corresponding to the multicast bandwidth part configuration, where the one or more multicast-specific assistance metrics facilitate UE adjustment of the multicast bandwidth part configuration, and transmit, to the set of UEs, the multicast communications in accordance with the multicast bandwidth part configuration.

Another apparatus for wireless communications at a base station is described. The apparatus may include means for transmitting a multicast bandwidth part configuration for multicast communications between the base station and a set of user equipments (UEs), establishing a multicast link with each of the set of UEs for transmissions of the multicast communications, transmitting, to the set of UEs, one or more multicast-specific assistance metrics corresponding to the multicast bandwidth part configuration, where the one or more multicast-specific assistance metrics facilitate UE adjustment of the multicast bandwidth part configuration, and transmitting, to the set of UEs, the multicast communications in accordance with the multicast bandwidth part configuration.

A non-transitory computer-readable medium storing code for wireless communications at a base station is described. The code may include instructions executable by a processor to transmit a multicast bandwidth part configuration for multicast communications between the base station and a set of user equipments (UEs), establish a multicast link with each of the set of UEs for transmissions of the multicast communications, transmit, to the set of UEs, one or more multicast-specific assistance metrics corresponding to the multicast bandwidth part configuration, where the one or more multicast-specific assistance metrics facilitate UE adjustment of the multicast bandwidth part configuration, and transmit, to the set of UEs, the multicast communications in accordance with the multicast bandwidth part configuration.

In some examples of the method, apparatuses, and non-transitory computer-readable medium described herein, transmitting, to the set of UEs, the one or more multicast-specific assistance metrics may include operations, features, means, or instructions for transmitting, to the set of UEs, the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

In some examples of the method, apparatuses, and non-transitory computer-readable medium described herein, the one or more multicast-specific assistance metrics include a maximum target modulation and coding scheme, a minimum physical downlink control channel aggregation level, or a combination thereof.

In some examples of the method, apparatuses, and non-transitory computer-readable medium described herein, the one or more multicast-specific assistance metrics include an allowed modulation and coding scheme range for a time period, an allowed physical downlink control channel aggregation level range for the time period, or a combination thereof.

In some examples of the method, apparatuses, and non-transitory computer-readable medium described herein, the one or more multicast-specific assistance metrics include a signal quality threshold, where the signal quality threshold may be based on a reference signal received power, a reference signal received quality, a layer 1 signal to interference and noise ratio, a channel state information reference signal (CSI-RS) signal to interference and noise ratio, or some combination thereof.

In some examples of the method, apparatuses, and non-transitory computer-readable medium described herein, the one or more multicast-specific assistance metrics include a minimum channel to reference signal measurement ratio.

Some examples of the method, apparatuses, and non-transitory computer-readable medium described herein may further include operations, features, means, or instructions for receiving channel state information feedback from a UE of the set of UEs, and transmitting updated one or more multicast-specific assistance metrics corresponding to the multicast bandwidth part configuration based on the channel state information feedback.

Some examples of the method, apparatuses, and non-transitory computer-readable medium described herein may further include operations, features, means, or instructions for identifying a change in a number of UEs receiving the multicast communications, changing a maximum number of multiple-input, multiple-output layers or a multicast data rate to be used for the multicast communications based on the change, and transmitting updated one or more multicast-specific assistance metrics corresponding to the maximum number of multiple-input, multiple-output layers or a multicast data rate to be used for the multicast communications.

Some examples of the method, apparatuses, and non-transitory computer-readable medium described herein may further include operations, features, means, or instructions for configuring a set of multicast bandwidth part configurations each with different one or more multicast-specific assistance metrics.

In some examples of the method, apparatuses, and non-transitory computer-readable medium described herein, the multicast-specific assistance metrics may be multicast service specific.

Some examples of the method, apparatuses, and non-transitory computer-readable medium described herein may further include operations, features, means, or instructions for transmitting a number of repetitions or retransmissions of the multicast communications, and receiving multicast feedback associated with the multicast communications on opportunistic multicast feedback resources in between slots prior to completion of the number of repetitions or retransmissions based on the UE being able to decode the multicast communications prior to completion of the number of repetitions or retransmissions.

Some examples of the method, apparatuses, and non-transitory computer-readable medium described herein may further include operations, features, means, or instructions for transmitting a number of repetitions or retransmissions of the multicast communications, and receiving multicast feedback associated with the multicast communications on unicast feedback resources prior to completion of the number of repetitions or retransmissions based on the UE being able to decode the multicast communications prior to completion of the number of repetitions or retransmissions.

A method of wireless communications at a UE is described. The method may include receiving a multicast bandwidth part configuration for multicast communications between a base station and the UE, where the multicast bandwidth part configuration includes a number of repetitions or retransmissions to be used for the multicast communications, receiving the multicast communications via a multicast link with the base station, determining that the UE is able to decode the multicast communications during a first portion of the number of repetitions or retransmissions prior to a remaining portion of the number of repetitions or retransmissions, and reducing radio frequency power during the remaining portion of the number of repetitions or retransmissions based on the determination that the UE is able to decode the multicast communications prior to completion of the number of repetitions or retransmissions.

An apparatus for wireless communications at a UE is described. The apparatus may include a processor, memory coupled with the processor, and instructions stored in the memory. The instructions may be executable by the processor to cause the apparatus to receive a multicast bandwidth part configuration for multicast communications between a base station and the UE, where the multicast bandwidth part configuration includes a number of repetitions or retransmissions to be used for the multicast communications, receive the multicast communications via a multicast link with the base station, determine that the UE is able to decode the multicast communications during a first portion of the number of repetitions or retransmissions prior to a remaining portion of the number of repetitions or retransmissions, and reduce radio frequency power during the remaining portion of the number of repetitions or retransmissions based on the determination that the UE is able to decode the multicast communications prior to completion of the number of repetitions or retransmissions.

Another apparatus for wireless communications at a UE is described. The apparatus may include means for receiving a multicast bandwidth part configuration for multicast communications between a base station and the UE, where the multicast bandwidth part configuration includes a number of repetitions or retransmissions to be used for the multicast communications, receiving the multicast communications via a multicast link with the base station, determining that the UE is able to decode the multicast communications during a first portion of the number of repetitions or retransmissions prior to a remaining portion of the number of repetitions or retransmissions, and reducing radio frequency power during the remaining portion of the number of repetitions or retransmissions based on the determination that the UE is able to decode the multicast communications prior to completion of the number of repetitions or retransmissions.

A non-transitory computer-readable medium storing code for wireless communications at a UE is described. The code may include instructions executable by a processor to receive a multicast bandwidth part configuration for multicast communications between a base station and the UE, where the multicast bandwidth part configuration includes a number of repetitions or retransmissions to be used for the multicast communications, receive the multicast communications via a multicast link with the base station, determine that the UE is able to decode the multicast communications during a first portion of the number of repetitions or retransmissions prior to a remaining portion of the number of repetitions or retransmissions, and reduce radio frequency power during the remaining portion of the number of repetitions or retransmissions based on the determination that the UE is able to decode the multicast communications prior to completion of the number of repetitions or retransmissions.

In some examples of the method, apparatuses, and non-transitory computer-readable medium described herein, determining that the UE may be able to decode the multicast communications during the first portion of the number of repetitions or retransmissions may include operations, features, means, or instructions for successfully decoding the multicast communications during the first portion of the number of repetitions or retransmissions prior to the remaining portion of the number of repetitions or retransmissions.

In some examples of the method, apparatuses, and non-transitory computer-readable medium described herein, determining that the UE may be able to decode the multicast communications during the first portion of the number of repetitions or retransmissions may include operations, features, means, or instructions for determining a link quality of the multicast link, and determining that the UE may be able to decode the multicast communications during the first portion of the number of repetitions or retransmissions based on the link quality of the multicast link.

Some examples of the method, apparatuses, and non-transitory computer-readable medium described herein may further include operations, features, means, or instructions for receiving a multicast feedback configuration that assigns multicast feedback resources interspersed with one or more repetitions or retransmissions of the number of repetitions or retransmissions.

Some examples of the method, apparatuses, and non-transitory computer-readable medium described herein may further include operations, features, means, or instructions for transmitting feedback associated with the multicast communications during the remaining portion of the number of repetitions or retransmissions based on the determination that the UE may be able to decode the multicast communications prior to completion of the number of repetitions or retransmissions.

In some examples of the method, apparatuses, and non-transitory computer-readable medium described herein, transmitting feedback associated with the multicast communications further may include operations, features, means, or instructions for transmitting the feedback associated with the multicast communications on opportunistic multicast feedback resources in between slots during the remaining portion of the number of repetitions or retransmissions based on the determination that the UE may be able to decode the multicast communications prior to completion of the number of repetitions or retransmissions.

In some examples of the method, apparatuses, and non-transitory computer-readable medium described herein, transmitting feedback associated with the multicast communications further may include operations, features, means, or instructions for transmitting the feedback associated with the multicast communications on unicast feedback resources during the remaining portion of the number of repetitions or retransmissions based on the determination that the UE may be able to decode the multicast communications prior to completion of the number of repetitions or retransmissions.

In some examples of the method, apparatuses, and non-transitory computer-readable medium described herein, the feedback associated with the multicast communications may be piggybacked with unicast feedback.

In some examples of the method, apparatuses, and non-transitory computer-readable medium described herein, determining that the UE may be able to decode the multicast communications during the first portion of the number of repetitions or retransmissions may include operations, features, means, or instructions for receiving one or more multicast-specific assistance metrics corresponding to the multicast bandwidth part configuration, and determining that the UE may be able to decode the multicast communications during the first portion of the number of repetitions or retransmissions based on the one or more multicast-specific assistance metrics.

In some examples of the method, apparatuses, and non-transitory computer-readable medium described herein, receiving the one or more multicast-specific assistance metrics may include operations, features, means, or instructions for receiving the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

In some examples of the method, apparatuses, and non-transitory computer-readable medium described herein, the one or more multicast-specific assistance metrics include a maximum target modulation and coding scheme, a minimum physical downlink control channel aggregation level, or a combination thereof.

In some examples of the method, apparatuses, and non-transitory computer-readable medium described herein, the one or more multicast-specific assistance metrics include an allowed modulation and coding scheme range for a time period, an allowed physical downlink control channel aggregation level range for the time period, or a combination thereof.

In some examples of the method, apparatuses, and non-transitory computer-readable medium described herein, the one or more multicast-specific assistance metrics include a signal quality threshold, where the signal quality threshold may be based on a reference signal received power, a reference signal received quality, a layer 1 signal to interference and noise ratio, a channel state information reference signal (CSI-RS) signal to interference and noise ratio, or some combination thereof.

In some examples of the method, apparatuses, and non-transitory computer-readable medium described herein, the one or more multicast-specific assistance metrics include a minimum channel to reference signal measurement ratio.

A method of wireless communications at a base station is described. The method may include transmitting a multicast bandwidth part configuration for multicast communications between the base station and a set of user equipments (UEs), where the multicast bandwidth part configuration includes a number of repetitions or retransmissions to be used for the multicast communications, transmitting, to the set of UEs, one or more multicast-specific assistance metrics corresponding to the multicast bandwidth part configuration, where the one or more multicast-specific assistance metrics facilitate early UE power-down prior to completion of the number of repetitions or retransmissions, and transmitting the multicast communications via a multicast link with each of the set of UEs in accordance with the multicast bandwidth part configuration.

An apparatus for wireless communications at a base station is described. The apparatus may include a processor, memory coupled with the processor, and instructions stored in the memory. The instructions may be executable by the processor to cause the apparatus to transmit a multicast bandwidth part configuration for multicast communications between the base station and a set of user equipments (UEs), where the multicast bandwidth part configuration includes a number of repetitions or retransmissions to be used for the multicast communications, transmit, to the set of UEs, one or more multicast-specific assistance metrics corresponding to the multicast bandwidth part configuration, where the one or more multicast-specific assistance metrics facilitate early UE power-down prior to completion of the number of repetitions or retransmissions, and transmit the multicast communications via a multicast link with each of the set of UEs in accordance with the multicast bandwidth part configuration.

Another apparatus for wireless communications at a base station is described. The apparatus may include means for transmitting a multicast bandwidth part configuration for multicast communications between the base station and a set of user equipments (UEs), where the multicast bandwidth part configuration includes a number of repetitions or retransmissions to be used for the multicast communications, transmitting, to the set of UEs, one or more multicast-specific assistance metrics corresponding to the multicast bandwidth part configuration, where the one or more multicast-specific assistance metrics facilitate early UE power-down prior to completion of the number of repetitions or retransmissions, and transmitting the multicast communications via a multicast link with each of the set of UEs in accordance with the multicast bandwidth part configuration.

A non-transitory computer-readable medium storing code for wireless communications at a base station is described. The code may include instructions executable by a processor to transmit a multicast bandwidth part configuration for multicast communications between the base station and a set of user equipments (UEs), where the multicast bandwidth part configuration includes a number of repetitions or retransmissions to be used for the multicast communications, transmit, to the set of UEs, one or more multicast-specific assistance metrics corresponding to the multicast bandwidth part configuration, where the one or more multicast-specific assistance metrics facilitate early UE power-down prior to completion of the number of repetitions or retransmissions, and transmit the multicast communications via a multicast link with each of the set of UEs in accordance with the multicast bandwidth part configuration.

Some examples of the method, apparatuses, and non-transitory computer-readable medium described herein may further include operations, features, means, or instructions for transmitting a multicast feedback configuration that assigns multicast feedback resources interspersed with one or more repetitions or retransmissions of the number of repetitions or retransmissions.

Some examples of the method, apparatuses, and non-transitory computer-readable medium described herein may further include operations, features, means, or instructions for receiving feedback associated with the multicast communications prior to completion of the number of repetitions or retransmissions.

In some examples of the method, apparatuses, and non-transitory computer-readable medium described herein, receiving feedback associated with the multicast communications prior to completion of the number of repetitions or retransmissions further may include operations, features, means, or instructions for receiving the feedback associated with the multicast communications on opportunistic multicast feedback resources in between slots of the number of repetitions or retransmissions.

In some examples of the method, apparatuses, and non-transitory computer-readable medium described herein, receiving feedback associated with the multicast communications prior to completion of the number of repetitions or retransmissions further may include operations, features, means, or instructions for receiving the feedback associated with the multicast communications on unicast feedback resources prior to completion of the number of repetitions or retransmissions.

In some examples of the method, apparatuses, and non-transitory computer-readable medium described herein, the feedback associated with the multicast communications may be piggybacked with unicast feedback.

In some examples of the method, apparatuses, and non-transitory computer-readable medium described herein, transmitting, to the set of UEs, the one or more multicast-specific assistance metrics may include operations, features, means, or instructions for transmitting, to the set of UEs, the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

In some examples of the method, apparatuses, and non-transitory computer-readable medium described herein, the one or more multicast-specific assistance metrics include a maximum target modulation and coding scheme, a minimum physical downlink control channel aggregation level, or a combination thereof.

In some examples of the method, apparatuses, and non-transitory computer-readable medium described herein, the one or more multicast-specific assistance metrics include an allowed modulation and coding scheme range for a time period, an allowed physical downlink control channel aggregation level range for the time period, or a combination thereof.

In some examples of the method, apparatuses, and non-transitory computer-readable medium described herein, the one or more multicast-specific assistance metrics include a signal quality threshold, where the signal quality threshold may be based on a reference signal received power, a reference signal received quality, a layer 1 signal to interference and noise ratio, a channel state information reference signal (CSI-RS) signal to interference and noise ratio, or some combination thereof.

In some examples of the method, apparatuses, and non-transitory computer-readable medium described herein, the one or more multicast-specific assistance metrics include a minimum channel to reference signal measurement ratio.

DETAILED DESCRIPTION

Figure 1:
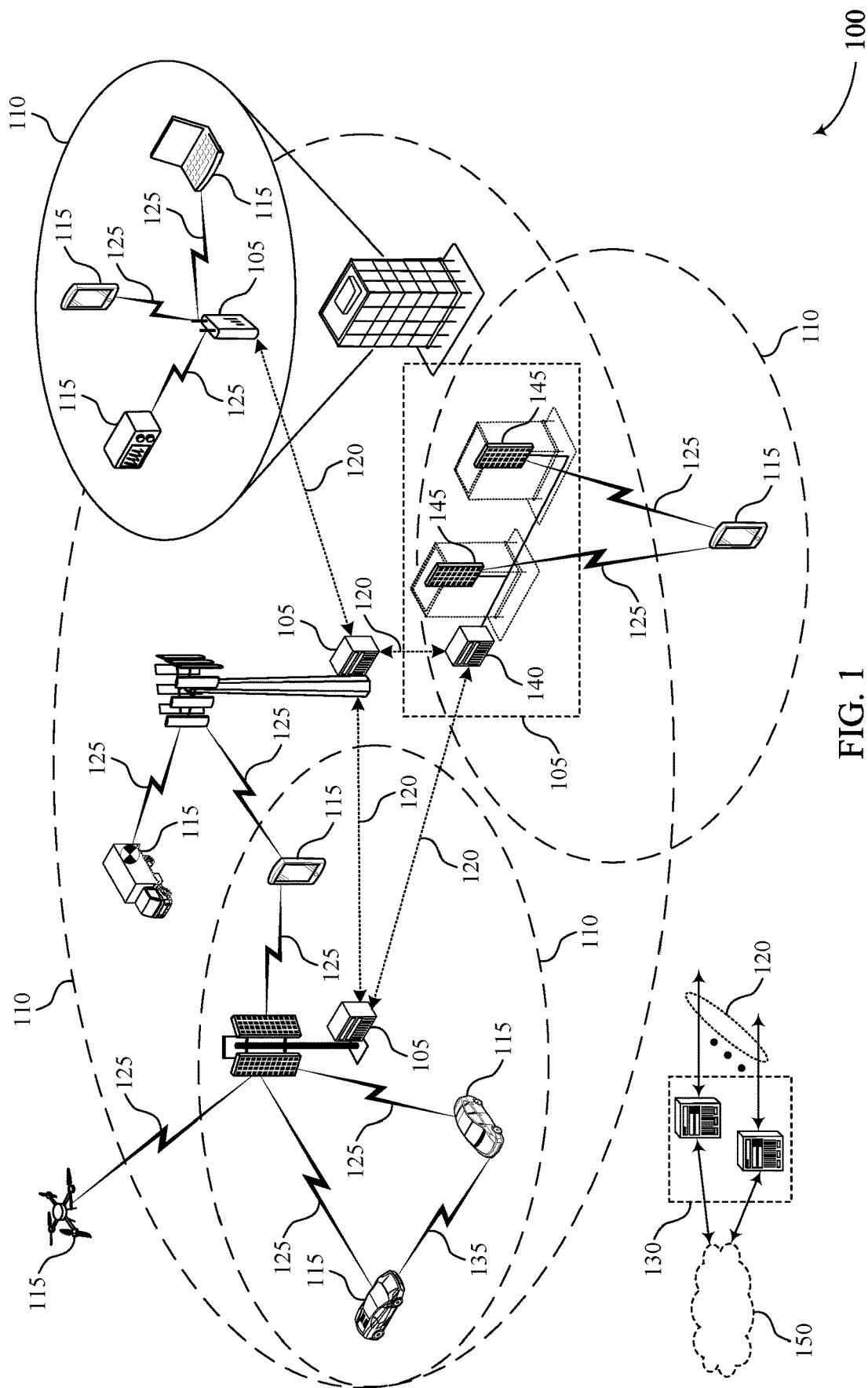
FIG. 1 illustrates an example of a system for wireless communications that supports power saving in new radio multicast in accordance with aspects of the present disclosure.

In some wireless communications systems, a user equipment (UE) may be configured to reduce power consumption during multicast reception when the UE has a good geometry or link quality, or both, with the base station. Generally, the described techniques provide for an efficient way for a UE to power down one or more components (e.g., antennas) during multicast reception. Efficient power down of the one or more components may be facilitated by assistance information from the base station.

Multicast services may deliver data transmissions concurrently to a number of UEs in a cell served by a base station. A UE may indicate to the base station that the UE would like to receive the multicast transmissions, and each UE that indicates interest may join the multicast group. Because UEs serviced by a multicast transmission may have varying link qualities with the serving base station, the multicast bandwidth part configuration used for serving the multicast communications may be selected by the base station so as to enable even the most weakly-connected UEs to receive the multicast communications. A UE in the multicast group with good signal quality may benefit from the use of fewer receive antennas, higher modulation and coding scheme (MCS) options, or fewer packet repetitions than a UE in the multicast group with poor signal quality.

A carrier may be used for a multicast link and may include a portion of a radio frequency spectrum band based on a bandwidth part configuration, and different bandwidth parts may be configured with different communication parameters. Thus, UEs that are strongly connected with the base station receive the same multicast bandwidth part configuration as do the weakly connected UEs. As such, if the strongly connected UEs were to follow a modified bandwidth part configuration, then the strongly connected UEs could achieve significant power savings.

According to aspects of this disclosure, a UE may reduce the number of antennas used by the UE to receive a multicast communication, for example, relative to the number of antennas used for unicast communications. In particular, the UE may receive a multicast bandwidth part configuration for the multicast communications. The configuration may specify a maximum number of multiple-input, multiple-output (MIMO) layers to be used for reception of the multicast communications. The specified number of MIMO layers may be used by the UE to determine a number of antennas to be used for reception of the associated transmission. However, when the UE has a higher multicast link quality than what is needed to successfully receive the multicast message at the number of MIMO layers designated by the base station, the UE may elect to reduce the number of antennas it uses to receive the multicast communications. The UE may optimize the adaptation of antennas with assistance metrics received from the base station. The assistance metrics may define a target maximum MCS and minimum aggregation level (AL) for the multicast communication. Alternatively, the assistance metrics may include an allowable range for the MCS or the AL for reception of the multicast communication. In other examples, the assistance metrics may include a signal quality threshold or a physical downlink shared channel (PDSCH)-to-reference signal ratio to which the UE may compare and adjust its number of receive antennas accordingly. The assistance metrics may be conveyed to the UE via different signaling options, including in a multicast wake signal, a multicast bandwidth part (BWP) switching command, a physical downlink control channel (PDCCH) scheduling the multicast communications, a medium access control (MAC) control element (CE) sent in a multicast PDSCH, or a multicast control channel (MCCH).

Additionally or alternatively, a UE may terminate reception after determining that the multicast communication is decodable earlier than a scheduled number or retransmissions or repetitions. For example, a UE may power down its radio frequency (RF) chain early because the UE has or could successfully decode a multicast transmission early— prior to completion of all scheduled communication repetitions or retransmissions. In one example, of successful decoding, the UE may simply decode the received transmission prior to reception of all scheduled retransmissions. Upon successful decoding, the UE may shut down its receive RF chain. In another example, the UE may receive information from the base station that allows the UE to determine in advance if the UE will be able to decode the multicast communications without needing all retransmissions of the multicast communication. The assistance information from the base station may be similar to that described above. Repetitions and retransmissions may be used interchangeably herein to refer to pre-scheduled repetitions of a communication or post-feedback scheduled retransmissions of the communication.

In some cases, the UE may also report to the base station that it has decoded the communications early. This early feedback may be facilitated via additional multicast-specific feedback resources, signaled to the UE via a feedback configuration, or the UE may piggyback its early multicast communications feedback with existing unicast communications feedback messages.

Aspects of the disclosure are initially described in the context of wireless communications systems. Aspects of the disclosure are further illustrated by and described with reference to apparatus diagrams, system diagrams, and flowcharts that relate to power saving in new radio multicast.

FIG. 1 illustrates an example of a wireless communications system 100 that supports power saving in new radio multicast in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The base stations 105 may support multicast and the transmission of multicast assistance information to a UE 115. In some examples, the multicast assistance information may include assistance metrics such as a target maximum MCS and minimum AL for the multicast communication, an allowable range for the MCS or the AL for reception of the multicast communication, a signal quality threshold, or a PDSCH-to-reference signal ratio to which the UE may compare and adjust its number of receive antennas accordingly, or any combination thereof. The base station 105 may convey the assistance metrics to the UE 115 via different signaling options, which may include in a multicast wake signal, a multicast BWP switching command, a PDCCH scheduling the multicast communications, a MAC CE sent in a multicast PDSCH, or a MCCH.

A UE 115 with a strong connection to the base station 105, with or without the assistance information, may enable a modified multicast configuration to save power by conserving resources. For example, UE 115 may adaptively reduce the number of antennas used to receive multicast transmissions in the multicast BWP in comparison to the number of antennas used to receive other communications (e.g., unicast or broadcast communications) in other BWPs. Additionally or alternatively, UE 115 may determine it is able to decode a multicast communication with multiple repetitions (or retransmissions) prior to the completion of the last repetition (or retransmission). Thus, UE 115 may terminate multicast reception early (e.g., prior to the completion of the last repetition) based on the determination of successful decoding. When the UE 115 terminates reception, the UE may power down one or more RF chains. Regardless of whether a UE 115 uses adaptive antennas reduction or early termination for multicast, the UE 115 may report to the base station 105 that it has decoded the multicast communications early. This early feedback may be facilitated via additional multicast-specific feedback resources, signaled to the UE 115 via a configuration. Alternatively, the UE 115 may piggyback the early multicast communications feedback with an existing unicast communications feedback message.

Figure 2:
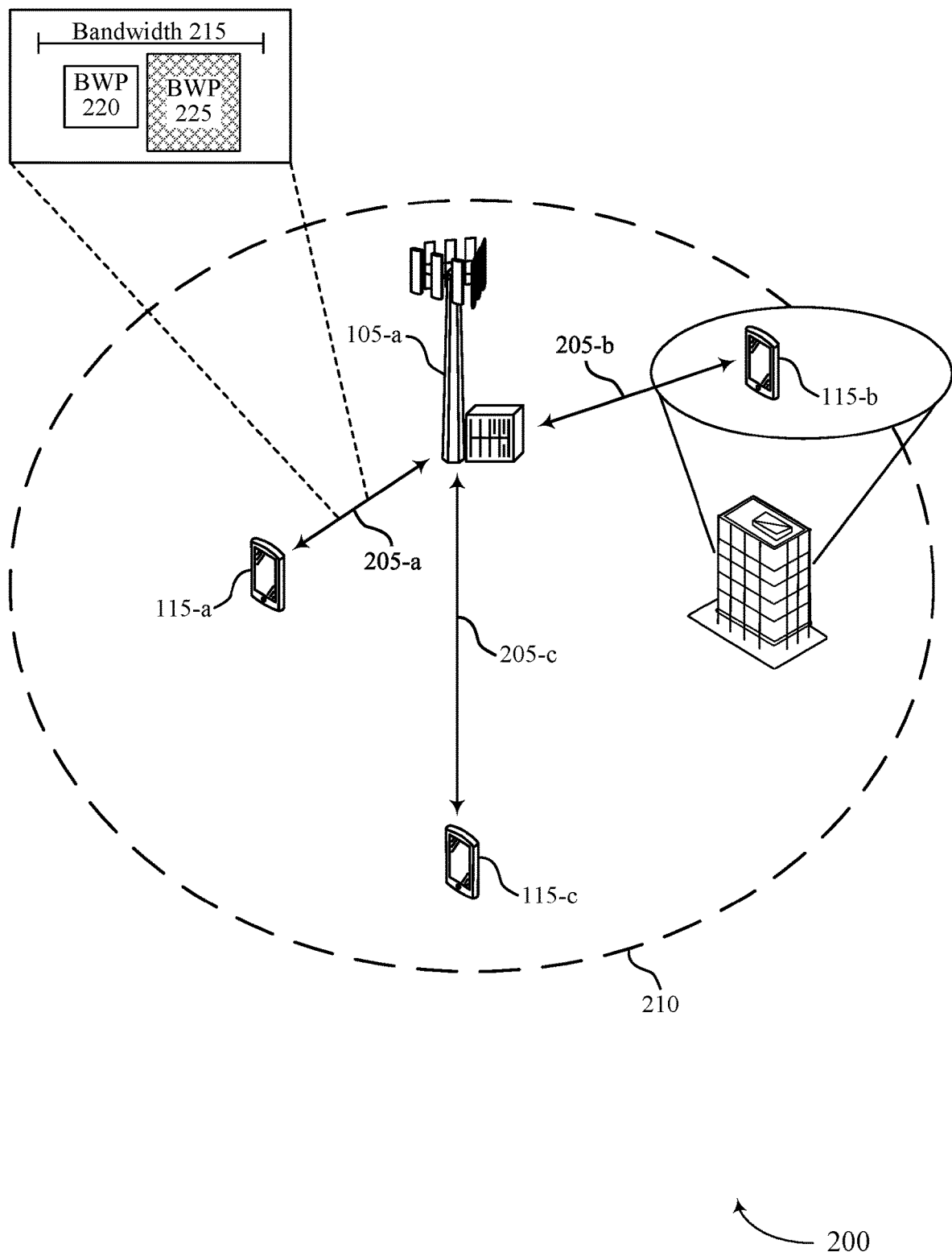
FIG. 2 illustrates an example of a system for wireless communications that supports power saving in new radio multicast in accordance with aspects of the present disclosure.

FIG. 2 illustrates an example of a wireless communications system 200 that supports power saving in new radio multicast in accordance with aspects of the present disclosure. In some examples, wireless communications system 200 may implement aspects of wireless communications system 100. Wireless communications system 200 may include base station 105-*a* and UEs 115-*a*, 115-*b*, and 115-*c*, which may be examples of corresponding base stations 105 and UEs 115, respectively, as described above with reference to FIG. 1.

Base station 105-*a* may support multicast to a 5G cell 210 (e.g., in a standalone or non-standalone mode) that UEs 115 may receive via communication links 205. The UEs 115 may be dispersed throughout the cell 210, such that each of the UEs 115-*a*, 115-*b*, and 115-*c* may experience a different connection or link quality of communication link 205 with the base station 105-*a*. For example, UE 115-*a* may have a strong connection via communication link 205-*a* to base station 105-*a* based on close proximity and clear line of sight, while UE 115-*a* may have an average connection via communication link 205-*c* with a clear line of sight but greater distance than UE 115-*a*, as the UE 115-*c* is located near the cell 210 edge. UE 115-*b* may be inside of a building within the cell 210 that leads UE 115-*b* to have a poor connection via communication link 205-*b* with base station 105-*a* compared to UEs 115-*a* and 115-*b*. If all UEs 115-*a*, 115-*b*, and 115-*c* are subscribed to a multicast service from base station 105-*a*, base station 105-*a* may configure a bandwidth part 220 or 225 for the multicast transmission with a transmission rate dictated by the poor geometry and link quality of UE 115-*b* and communication link 205-*b*. Thus, the base station base station 105-*a* may configure the transmission to the multicast group of UEs 115-*a*, 115-*b*, and 115-*c*, to a low transmission rate (e.g., a low number of MIMO layers, a small MCS, a large number of repetitions, or some combination thereof).

In some examples, base station 105-*a* may configure multiple bandwidth parts 220 and 225 in a bandwidth 215 to have different metrics for different data transmission rates. For example, a multicast bandwidth part (e.g., BWP 225) configured for a low transmission rate may be defined by 2 MIMO layers, an MCS of 0, 8 repetitions, or any combination thereof, while a multicast bandwidth part (e.g., BWP 220) configured for a high transmission rate may be defined by 4 MIMO layers, an MCS of 5, 4 repetitions, or any combination thereof. The configurations may be indicated to UEs 115 via radio resource configuration (RRC) signaling. In some examples, additional bandwidth parts may be configured for unicast.

In the example illustrated in FIG. 2, the base station 105-*a* may select bandwidth part 225 for each communication link 205 for multicast communications with UEs 115. Bandwidth part 225 may be configured for a low transmission rate, which may be selected based on the poor channel state information (CSI) feedback from UE 115-*b*. In this example, UE 115-*a* may benefit from performing a modified multicast reception from the bandwidth part configuration to conserve power. For example, UE 115-*a* may support a higher reception rate than that configured for the multicast communications, and UE 115-*a* may determine to reduce the number of receive antennas used for multicast (e.g., from 4 to 2 antennas), relative to the antennas used for unicast communications from base station 105-*a*, while maintaining a sufficient reception rate for the bandwidth part configuration. Additionally or alternatively, UE 115-*a* with good link quality at communication link 205-*a* may determine it is able to decode the multicast communication in BWP 225 after the first or second repetition of the 8 repetitions of the multicast message. UE 115-*a* may decide to power down the RF chain used to receive the multicast service based on determining that decoding has been or will be successful. In some cases, UE 115-*a* may also perform power saving procedures similar to those used for unicast. When UE 115 supports simultaneous reception of multicast and unicast, the unicast scheduling should take the multicast configuration into account, such that metric configurations are consistent.

The base station 105-*a* may aid power saving at the UEs 115 by providing assistance metrics that convey the minimum resources sufficient to receive the multicast communications. The base station 105-*a* may indicate additional assistance metrics associated with the multicast bandwidth part (e.g., BWP 225). In some cases, the assistance metrics may include at least one of: a maximum target MCS with a potential minimum AL for the PDCCH, an indication not to increase MCS and decrease PDCCH AL beyond a certain range for a given period of time, a signal quality threshold, and a minimum PDSCH-to-reference signal (RS) ratio.

An indication regarding the maximum target MCS and minimum AL for the PDCCH may allow UE 115-*a* to further reduce its active receive antennas for multicast reception based on its own geometry or CSI measurement. An indication including instructions not to increase MCS and decrease PDCCH AL beyond a certain range for a given period of time may result in an allowable range for the MCS or the AL for reception of the multicast communication for a given time, which may allow UE 115-*a* to determine the maximum MCS and minimum PDCCH AL for a given period based on past scheduling and adjust its receive antennas accordingly. In some examples, the signal quality threshold may be based on one or more of a reference signal received power (RSRP), a reference signal received quality (RSRQ), a layer 1 signal to interference and noise ratio (L1-SINR), and a channel state information reference signal (CSI-RS) signal to interference and noise ratio. The signal quality threshold may allow UE 115-*a* to use a reduced number of receive antennas when UE 115-*a* observes metric above configured threshold. In some cases, different threshold may be configured for different numbers of receive antennas. Additionally or alternatively, the signal quality threshold may allow UE 115-*a* to determine an ability to decode multicast transmissions early when UE 115-*a* observes metric above configured threshold. An indication including a minimum PDSCH to RS ratio may include a PDSCH to synchronization signal block (SSB) ratio or a PDSCH to CSI-RS ratio, and may allow UE 115-*a* to obtain a signal quality of a PDSCH based on downlink RS measurements and adjust its number of receive antennas accordingly. This ratio may be useful because the signal quality determination is used for receiving the PDSCH but is actually measured on the pilot RSs and not directly measure the PDSCH.

These assistance metrics may be multicast service specific and may improve a UE's 115 ability to determine when to reduce the number of receive antennas and/or when early decoding is possible. Thus, leading to improved power saving. Multiple options may be considered for transmitting the assistance metric indication. For instance, the assistance metrics may be signaled in a multicast wake signal, such that during the wake up signal, base station 105-*a* may indicate the assistance information to all UEs 115. Another example may include assistance metrics being conveyed by a multicast bandwidth part switching command. As discussed above, a given multicast bandwidth part (e.g., BWP 220) is associated with specific assistance metrics, and base station 105-*a* may switch to different a multicast bandwidth part (e.g., BWP 225) for different assistance metrics. This may be an implicit indication of the assistance metrics. In another example, the assistance metrics may be signaled in the PDCCH that schedules the multicast communication. Alternatively, the assistance metrics may be signaled via a MAC CE sent in a multicast PDSCH, or the assistance metrics may be signaled in a MCCH.

In some examples, UEs 115 may provide CSI feedback to base station 105-*a*. For example, UE 115-*a* may have separate CSI feedback for multicast with reduced number of receive antennas unlike UEs 115-*b* and 115-*c*. For instance, the separate CSI feedback may indicate UE 115-*a* is using a reduced MCS from that indicated by the bandwidth part configuration. Additionally or alternatively, UE 115-*a* may be configured to provide early feedback via additional multicast feedback resources, unicast feedback resources, or both, prior to the prescheduled multicast feedback after all of the retransmissions.

Figure 3:
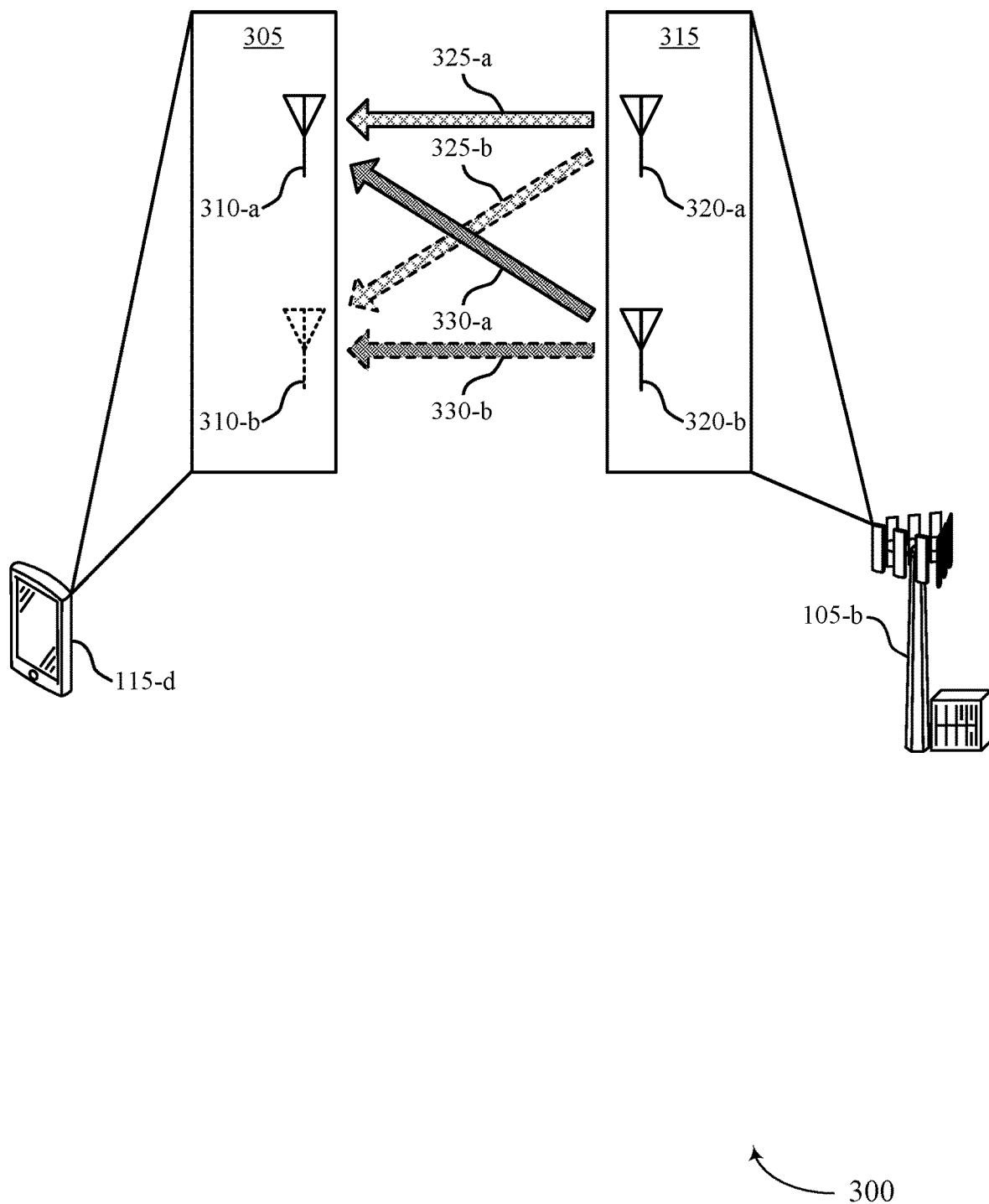
FIG. 3 illustrates an example of a multiple input, multiple output antenna configuration that supports power saving in new radio multicast in accordance with aspects of the present disclosure.

FIG. 3 illustrates an example of a multiple input, multiple output (MIMO) antenna configuration 300 that supports power saving in new radio multicast in accordance with aspects of the present disclosure. In some examples, MIMO antenna configuration 300 may implement aspects of wireless communications system 100. MIMO antenna configuration 300 may include base station 105-*b* and UE 115-*d*, which may be examples of corresponding base stations 105 and UEs 115, respectively, as described above with reference to FIGS. 1 and 2.

The base station 105-*b* and the UE 115-*d* may be equipped with multiple antennas 320 and 310, respectively, which may be used to employ MIMO communication techniques. The antennas 320 of the base station 105-*b* and antennas 310 of the UE 115-*d* may each be respectively located within one or more antenna arrays or antenna panels (e.g., array 305 for UE 115-*d* and array 315 for base station 105-*b*), which may support MIMO operations. For example, one or more base station 105-*b* antennas 320, or antenna arrays 315, may be co-located at an antenna assembly, such as an antenna tower. In some examples, antennas 320 or antenna arrays 315 associated with the base station 105-*b* may be located in diverse geographic locations. The base station 105-*b* may have an antenna array 315 with a number of rows and columns of antenna ports that the base station 105-*b* may use to support MIMO and beamforming of communications with UE 115-*d*. Likewise, the UE 115-*d* may have one or more antenna arrays 305 that may support various MIMO and beamforming operations.

The base station 105-*b* and the UE 115-*d* may use MIMO communications to exploit multipath signal propagation and increase the spectral efficiency by transmitting or receiving multiple signals (e.g., signals 325 and 330) via different spatial layers shown by different shading of signals 325 and 330. Such techniques may be referred to as spatial multiplexing. The multiple signals 325 and 330 may, for example, be transmitted by the base station 105-*b* via different antennas 320-*a* and 320-*b*. Likewise, the multiple signals 325 and 330 may be received by the UE 115-*d* via different antennas 310-*a* and 310-*b*. In some cases, more antennas 310 and 320 may be present at the UE 115-*d* or base station 105-*b*. Each of the multiple signals (e.g., 325-*a*, 325-*b*, 330-*a*, and 330-*b*) may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

In some examples, UE 115-*d* and base station 105-*b* may use the illustrated MIMO antenna configuration 300 for multicast communications transmitted from the base station 105-*b* to UE 115-*d*. The UE 115-*d* may be an example of a UE 115 with a strong connection and high link quality with base station 105-*b* relative to other multicast UEs 115 not shown. Base station 105-*b* may configure a multicast BWP for a group of multicast UEs 115 including UE 115-*d*, and the multicast BWP configuration may have less MIMO capability compared to a unicast BWP configuration for UE 115-*d*. For example, fewer spatial layers may be used in the multicast configuration than a unicast configuration. When UE 115-*d* prepares for multicast reception, UE 115-*d* may switch from a unicast BWP configuration or another multicast BWP configuration to the multicast BWP configuration during the group radio network temporary identity (G-RNTI) active duration for the multicast group. The multicast BWP may have a different or fewer number of MIMO layers compared to a unicast BWP, which may allow the UE 115-*d* to potentially use a reduced number of receive antennas 310 within the multicast BWP. For instance, UE 115-*d* may use both antennas 310-*a* and 310-*b* for unicast reception on a unicast BWP, but UE 115-*d* may use one antenna, for example, antenna 310-*a* and not use antennas 310-*b* for multicast reception on the multicast BWP. Thus, antenna 310-*b* may be powered down and not receive signals 325-*b* and 330-*b*, and the UE 115-*d* may conserve power during the multicast reception with a satisfactory link quality using one antenna 310-*a*. This adaptive antenna 310 reduction may be possible when UE 115-*d* has a better link quality than the configuration indicated by the multicast BWP configuration.

The base station 105-*d* may indicate assistance metrics associated with the multicast BWP for better UE 115-*d* power saving. For example, the base station 105-*b* may help power saving at the UE 115-*d* by providing assistance metrics that convey the minimum resources sufficient to receive the multicast communications. For example, the base station 105-*b* may indicate assistance metrics associated with the multicast BWP that may include a maximum target MCS with a potential minimum AL for the PDCCH, an indication not to increase MCS and decrease PDCCH AL beyond a certain range for a given period of time, a signal quality threshold, a minimum PDSCH to RS (e.g., CSI-RS) or SSB ratio, or some combination thereof.

Assistance information indicating the maximum target MCS and minimum AL for the PDCCH may allow UE 115-*d* to further reduce its active receive antennas 310 for multicast reception based its own geometry or CSI measurement. An indication including instructions not to increase MCS and decrease PDCCH AL beyond a certain range for a given period of time may result in an allowable range for the MCS or the AL for reception of the multicast communication for a given time, which may allow UE 115-*d* to determine the maximum MCS and minimum PDCCH AL for a given period based on past scheduling and adjust its receive antennas 310 accordingly. The signal quality threshold may allow UE 115-*d* to use a reduced number of receive antennas 310 when UE 115-*d* observes metric above configured threshold. In some cases, different threshold may be configured for different numbers of receive antennas 310. An indication including a minimum PDSCH to RS or SSB ratio may allow UE 115-*d* to obtain a signal quality of a PDSCH based on downlink RS or SSB measurements and adjust its number of receive antennas 310 accordingly. Thus, these assistance metrics may be multicast service specific and may improve a UE's 115-*d* ability to determine when to reduce the number of receive antennas. Thus, leading to improved power saving.

Multiple options may be considered for transmitting the assistance metrics. For instance, the assistance metrics may be signaled in a multicast wake signal, such that during the wake up signal, base station 105-*b* may indicate the assistance information to UE 115-*d*. Another example may include assistance metrics being conveyed by a multicast BWP switching command. As discussed above, a given multicast bandwidth part is associated with specific assistance metrics, and base station 105-*b* may switch to a different multicast bandwidth part for different assistance metrics. This may be an implicit indication of the assistance metrics. In another example, the assistance metrics may be signaled in the PDCCH that schedules the multicast communication. Alternatively, the assistance metrics may be signaled via a MAC CE sent in a multicast PDSCH, or the assistance metrics may be signaled in a MCCH.

In some cases, UE 115-*d* may support simultaneous or contemporaneous multicast and unicast receptions. According to aspects of this disclosure, the concurrent unicast scheduling may take the multicast configuration into account. For example, the unicast BWP metrics may be consistent with the multicast BWP metrics (e.g., MCS and AL).

UE 115-*d* may provide CSI feedback to base station 105-*b*. For example, UE 115-*d* may have separate CSI feedback for multicast with reduced number of receive antennas 310. For instance, the separate CSI feedback may indicate UE 115-*d* is using one receive antenna 310-*a* to maintain a reception rate sufficient to receive the multicast communications. Additionally or alternatively, UE 115-*d* may be configured to provide early feedback via additional multicast feedback resources, unicast feedback resources, or both, prior to the prescheduled multicast feedback after all of the retransmissions, which will be discussed in greater detail with reference to FIG. 4.

The assistance metrics from base station 105-*b* may be signaled or updated based on UE 115-*d* updated CSI feedback as well as if the multicast group link quality changes. For instance, some UEs 115 may no longer be interested in a given multicast service from base station 105-*b*, which may result in an improvement in the average multicast group link quality if a UE 115 that unsubscribed from the service had poor link quality. This may lead to the use of a new and improved transmission rate, which may use a different multicast BWP configuration.

Figure 4:
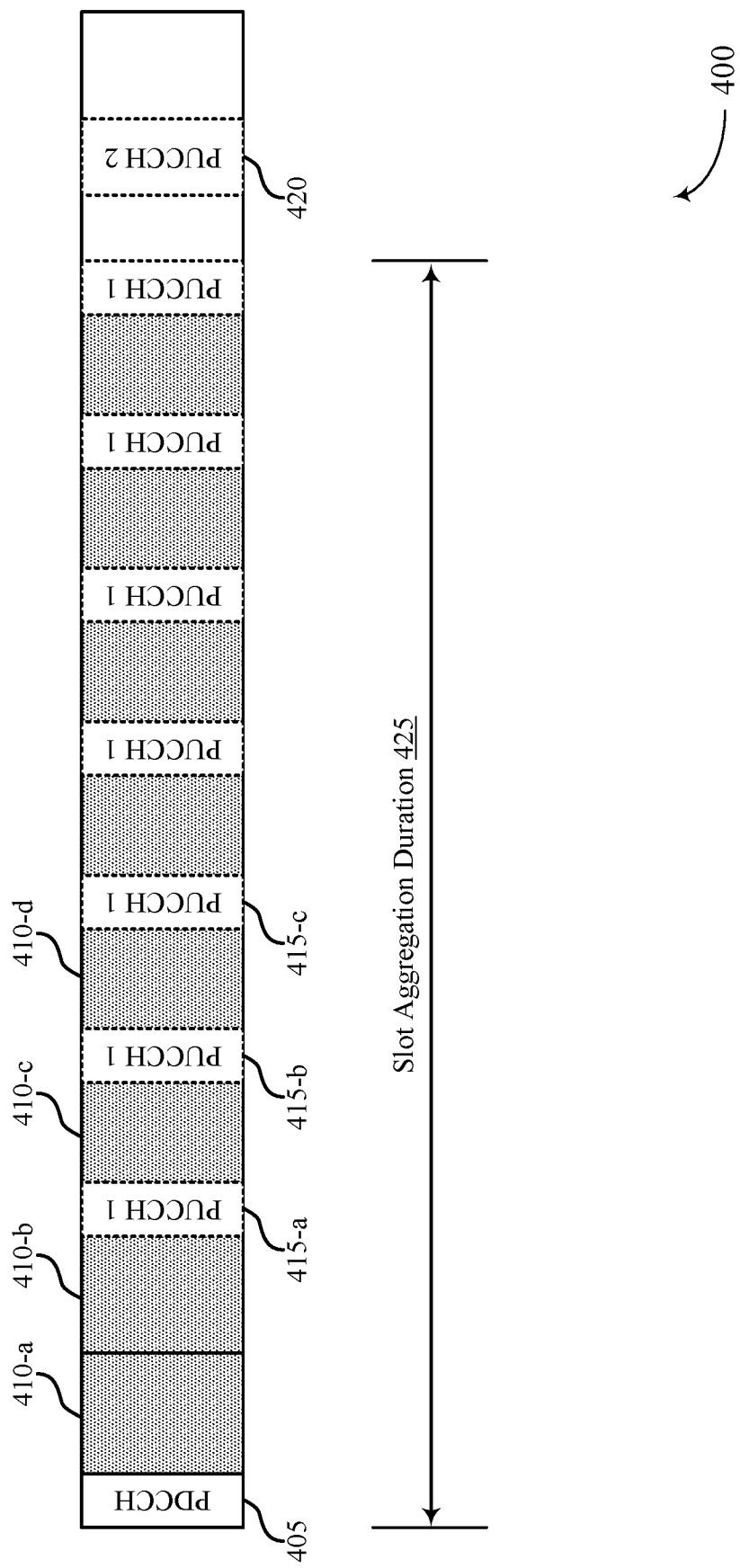
FIG. 4 illustrates an example of a bandwidth part that supports power saving in new radio multicast in accordance with aspects of the present disclosure.

FIG. 4 illustrates an example of a bandwidth part 400 that supports power saving in new radio multicast in accordance with aspects of the present disclosure. In some examples, bandwidth part 400 may implement aspects of wireless communications system 100. Bandwidth part 400 may be a multicast BWP configured for additional feedback from a UE 115 to a base station 105 as described above with reference to FIGS. 1, 2, and 3.

Bandwidth part 400 may include a slot aggregation duration 425 comprising a multicast transmission in 8 TTIs 410 (e.g., 8 slots). Each shaded TTI 410 may include a repetition of a multicast communication scheduled by PDCCH 405. A UE 115 may use a reduced number of TTIs 410 (e.g., symbols or slots) for multicast packet reception when the UE 115 determines it may be able to decode the multicast packet without receiving all the TTIs 410 during the transmission. This early decoding is likely the result of a good multicast link quality between the base station 105 and UE 115. Once the UE 115 determines it is able to decode the multicast packet without receiving all the TTIs 410 during the transmission, UE 115 may power down the RF chain that would be used to receive the remaining TTIs 410 to conserve power.

The UE 115 may determine that it may be able to decode the multicast packet without receiving all of the TTIs 410 during the transmission in a number of ways. For example, UE 115 may receive the multicast repetitions in TTIs 410-a and 410-b and successfully decode the multicast communication to determine it is able to decode. Additionally or alternatively, UE 115 may use assistance information from the base station 105 to perform early termination without actual packet decoding, which may enable UE 115 to power down the RF chain sooner and result in more efficient power saving than actual decoding. For example, the assistance information may indicate a lower MCS than the UE 115 may support, such that the UE 115 may know it will be able to decode the multicast communication without receiving every repetition of the multicast communication.

In some cases, a UE 115 may receive a feedback configuration from the base station 105 (e.g., via an RRC message) that early feedback may be transmitted prior to the scheduled feedback at a physical uplink control channel (PUCCH), for example PUCCH 2 420, which is after the slot aggregation duration 425. Thus, UE 115 may be further configured to provide early feedback in a PUCCH 1 415. Early feedback may allow a base station 105 to adjust future transmissions more efficiently based on feedback than later feedback.

For example, the feedback configuration may indicate that UE 115 is provided with additional multicast feedback resources, PUCCH 1 415, in between of the TTIs 410 of the multicast communication. The PUCCH 1 415 may be used opportunistically based on successful decoding. For instance, if UE 115 cannot successfully decode the multicast communication after receiving TTI 410-b, UE may not transmit any feedback (e.g., negative acknowledgment (NACK) or acknowledgment (ACK)) in PUCCH 1 415-a. But, UE 115 may successfully decode the multicast communication after receiving TTI 410-b, and UE may transmit feedback (e.g., CSI or ACK) in PUCCH 1 415-b or a subsequent PUCCH 1 415 (e.g., PUCCH 1 415-c).

In another example, the feedback configuration may indicate that UE 115 may opportunistically piggyback early multicast feedback in a PUCCH 1 415 when UE 115 provides scheduled unicast feedback. Thus, UE 115 may be provided with the regular multicast feedback resources after the full transmission of the multicast packet, PUCCH 2 420, and the feedback configuration may allow UE 115 to provide additional or opportunistic feedback for the multicast communication to indicate that UE 115 may decode the multicast communication with unicast feedback or data (e.g., PUCCH or PUSCH) to network prior to PUCCH 2 420. In this case, the pre-configured bitwidth and/or fields can be used to piggyback multicast feedback with unicast.

Figure 5:
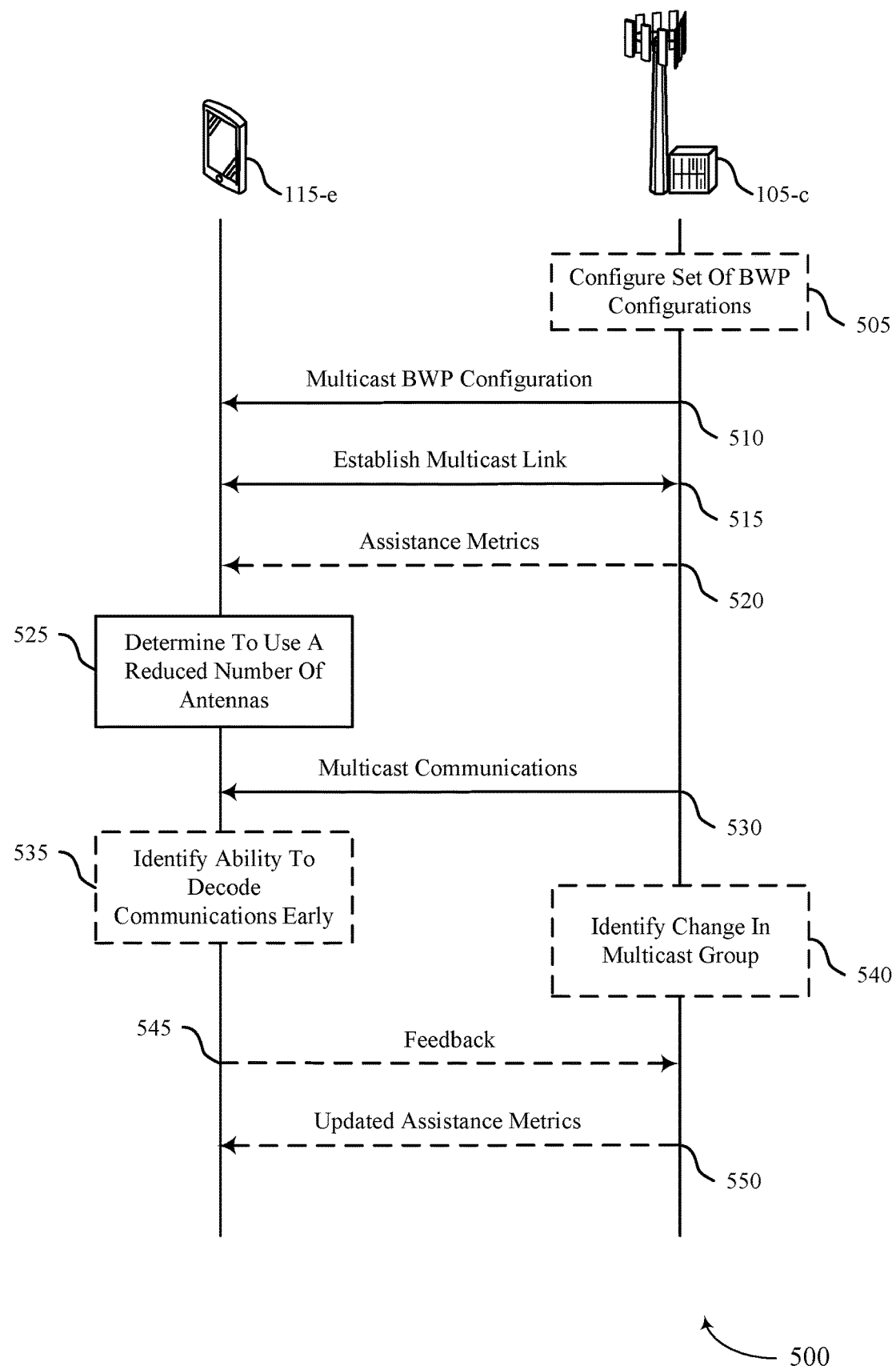
FIGS. 5 and 6 illustrate examples of a process flow that supports power saving in new radio multicast in accordance with aspects of the present disclosure.

FIG. 5 illustrates an example of a process flow 500 that supports power saving in new radio multicast in accordance with aspects of the present disclosure. In some examples, process flow 500 may implement aspects of wireless communications system 100. Process flow 500 includes UE 115-e and base station 105-c, which may be examples of the corresponding devices as described with respect to FIGS. 1 through 4. For example, UE 115-e may be an example of UE 115-a of FIG. 2, and base station 105-c may be an example of base station 105-a of FIG. 2.

In the following description of the process flow 500, the operations between base station 105-c and UE 115-e may be transmitted in a different order than the exemplary order shown, or the operations performed by base station 105-c and UE 115-e may be performed in different orders or at different times. Certain operations may also be left out of the process flow 500, or other operations may be added to the process flow 500. It is to be understood that while base station 105-c and UE 115-e are shown performing a number of the operations of process flow 500, any wireless device may perform the operations shown.

At 505, base station 105-c may optionally configure a set of BWP configurations. In some examples, the one or more multicast-specific assistance metrics may be associated with a multicast BWP configuration, and different multicast-specific assistance metrics may be associated with a second multicast bandwidth part configuration.

At 510, base station 105-c may transmit, and UE 115-e may receive one or more multicast bandwidth part configurations for multicast communications between base station 105-c and the UE 115-e, where the multicast bandwidth part configuration may include a maximum number of MIMO layers and/or repetitions to be used for the multicast communications.

At 515, UE 115-e and base station 105-c may establish a multicast link for the transmission and reception of the multicast communications, and the multicast link may have an above average link quality. In some examples, establishing the multicast link may include switching to the multicast bandwidth part configuration during a group active time period.

At 520, base station 105-c may optionally transmit, and UE 115-e may optionally receive one or more assistance metrics corresponding to the multicast bandwidth part configuration. In some cases, the one or more multicast-specific assistance metrics may be conveyed to UE 115-e via a multicast wake signal, a multicast bandwidth part switching command, a physical downlink control channel scheduling multicast message, a medium access control-control element in a multicast physical downlink shared channel, a multicast control channel, or a combination thereof.

At 525, UE 115-e may determine, based at least in part on a link quality of the multicast link established at 515, to use a reduced number of antennas for multicast reception relative to the number of antennas used for unicast reception. In some examples, determining to use fewer antennas for reception of the multicast communications may also be based on the one or more multicast-specific assistance metrics received at 520.

At 530, base station 105-c may transmit, and UE 115-e may receive multicast communications. In some examples, UE 115-e may use a reduced number of antennas to receive the multicast communications based on the determination at

525. In some cases, UE 115-*e* may optionally receive a unicast communication contemporaneously with the multicast communications at 530, where the UE 115-*e* uses consistent (e.g., a same) MCS and AL for the unicast communication and the multicast communications.

At 535, UE 115-*e* may optionally identify that it is able to decode the multicast communications 530 prior to completion of a number of retransmissions of the multicast communications, for example, prior to the end of the transmission at 530.

At 540, base station 105-*c* may optionally identify a change in the group of multicast UEs. This change may result in a new average multicast group link quality.

At 545, UE 115-*e* may optionally transmit, and base station 105-*c* may optionally receive feedback, for example CSI feedback, for the multicast communications at 530. In some examples, UE 115-*e* may optionally transmit CSI specific to the channel reception using a reduced number of antennas. At 545, UE 115-*e* may optionally transmit, and base station 105-*c* may optionally receive multicast feedback associated with the multicast communications on opportunistic unicast feedback resources or multicast feedback resources in between slots prior to completion of the number of retransmissions based at least in part on the determination that the UE is able to decode the multicast communications prior to completion of the number of retransmissions at 535.

At 550, base station 105-*c* may optionally transmit, and UE 115-*e* may optionally receive one or more updated assistance metrics corresponding to the multicast bandwidth part configuration based at least in part on a change to the number of MIMO layers to be used for the multicast communications. In some examples, the change to the number of MIMO layers to be used for the multicast communications is based on the CSI feedback at 545 and/or identifying that a number of UEs 115 receiving the multicast communications at 540.

Figure 6:
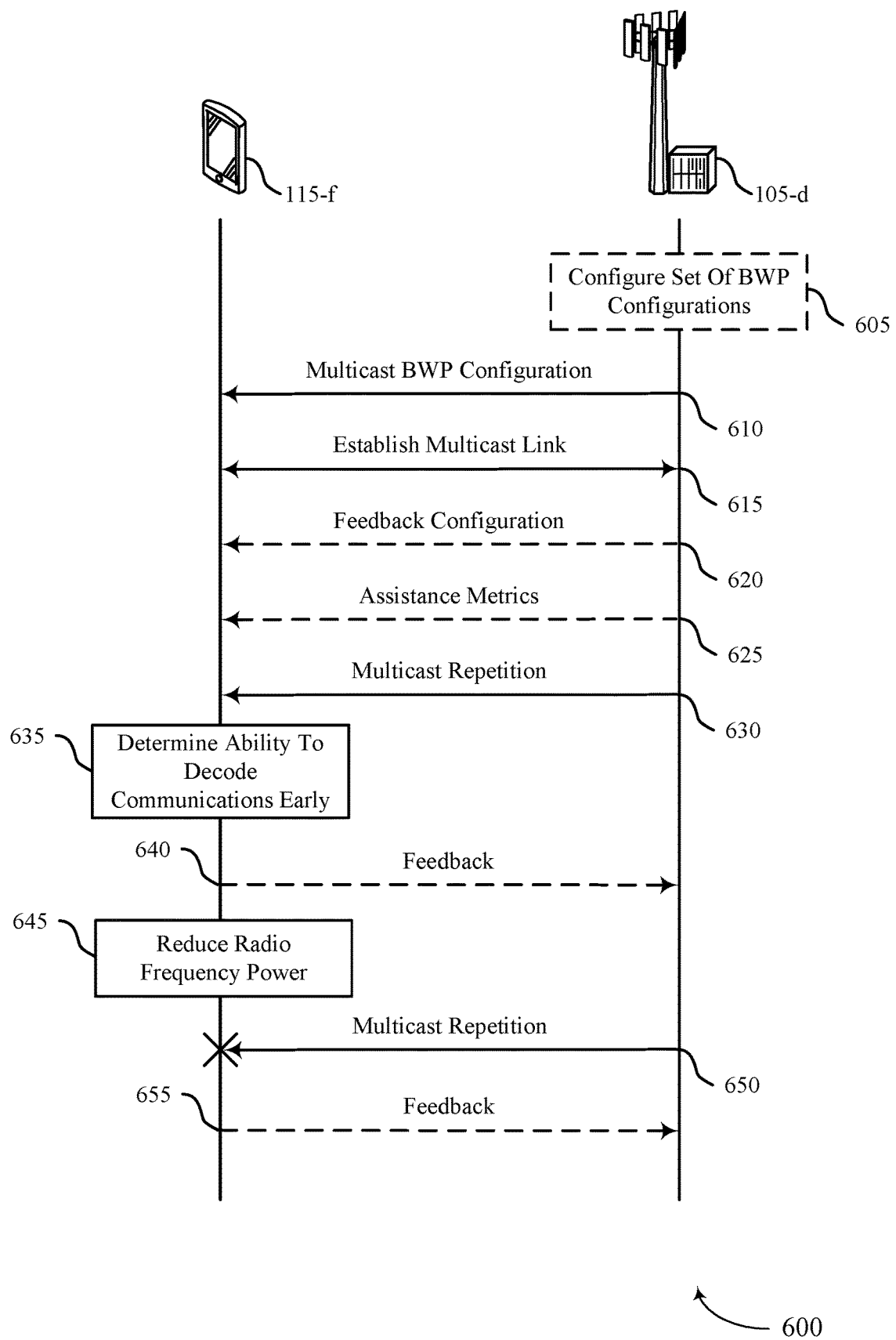

FIG. 6 illustrates an example of a process flow 600 that supports power saving in new radio multicast in accordance with aspects of the present disclosure. In some examples, process flow 600 may implement aspects of wireless communications system 100. Process flow 600 includes UE 115-*e* and base station 105-*c*, which may be examples of the corresponding devices as described with respect to FIGS. 1 through 4. For example, UE 115-*e* may be an example of UE 115-*a* of FIG. 2, and base station 105-*c* may be an example of base station 105-*a* of FIG. 2.

In the following description of the process flow 600, the operations between base station 105-*d* and UE 115-*f* may be transmitted in a different order than the exemplary order shown, or the operations performed by base station 105-*d* and UE 115-*f* may be performed in different orders or at different times. Certain operations may also be left out of the process flow 600, or other operations may be added to the process flow 600. It is to be understood that while base station 105-*d* and UE 115-*f* are shown performing a number of the operations of process flow 600, any wireless device may perform the operations shown.

At 605, base station 105-*d* may optionally configure a set of BWP configurations. In some examples, the one or more multicast-specific assistance metrics may be associated with a multicast BWP configuration, and different multicast-specific assistance metrics may be associated with a second multicast bandwidth part configuration.

At 610, base station 105-*d* may transmit, and UE 115-*f* may receive one or more multicast BWP configurations for multicast communications between base station 105-*d* and the UE 115-*f*, where the multicast bandwidth part configuration may include a number of MIMO layers and/or repetitions to be used for the multicast communications.

At 615, UE 115-*f* and base station 105-*d* may establish a multicast link for the transmission and reception of the multicast communications, and the multicast link may have an above average link quality. In some examples, establishing the multicast link may include switching to the multicast bandwidth part configuration during a group active time period.

At 620, base station 105-*d* may optionally transmit, and UE 115-*f* may optionally receive a feedback configuration that assigns multicast feedback resources interspersed with one or more retransmissions of the number of retransmissions, indicates that multicast feedback may be piggybacked with unicast, or both.

At 625, base station 105-*d* may optionally transmit, and UE 115-*f* may optionally receive one or more assistance metrics corresponding to the multicast bandwidth part configuration. In some cases, the one or more multicast-specific assistance metrics may be conveyed to UE 115-*f* via a multicast wake signal, a multicast bandwidth part switching command, a physical downlink control channel scheduling multicast message, a medium access control-control element in a multicast physical downlink shared channel, a multicast control channel, or a combination thereof.

At 630, base station 105-*d* may transmit, and UE 115-*f* may receive one or more repetitions of a multicast communication.

At 635, UE 115-*f* may determine it is able to decode the multicast communications during a first portion of the number of retransmissions prior to a remaining portion of the number of retransmissions, for example, prior to the last repetition of the multicast communication at 650. In some cases, determining that the UE 115-*f* is able to decode the multicast communications during the first portion of the number of retransmissions may include successfully decoding the multicast communications during the first portion of the number of retransmissions prior to the remaining portion of the number of retransmissions. In other cases, determining that the UE 115-*f* is able to decode the multicast communications during the first portion of the number of retransmissions may include determining that the UE 115-*f* is able to decode the multicast communications, without actual decoding, during the first portion of the number of retransmissions based on the link quality of the multicast link established at 615. In some examples, the determining that the UE 115-*f* is able to decode the multicast communications during the first portion of the number of retransmissions may be based on the one or more multicast-specific assistance metrics received at 625.

At 640, UE 115-*f* may optionally transmit, and base station 105-*d* may optionally receive opportunistic multicast feedback. For example, the opportunistic multicast feedback may be feedback associated with the multicast communications that is transmitted during the remaining portion of the number of retransmissions (e.g., on additional multicast feedback resources or with unicast feedback) based at least in part on the determination that the UE is able to decode the multicast communications prior to completion of the number of retransmissions at 635.

At 645, UE 115-*f* may reduce radio frequency power during the remaining portion of the number of retransmissions based at least in part on the determination that the UE is able to decode the multicast communications prior to completion of the number of retransmissions, for example, prior to the last repetition of the multicast communication at 650.

At 650, base station 105-d may transmit one or more repetitions of the multicast communication, however, UE 115-f may not receive the one or more repetitions if radio frequency power to the receive antennas was reduced at 645.

At 655, UE 115-f may optionally transmit, and base station 105-d may optionally receive scheduled multicast feedback, for example when no feedback is transmitted at 640.

Figure 7:
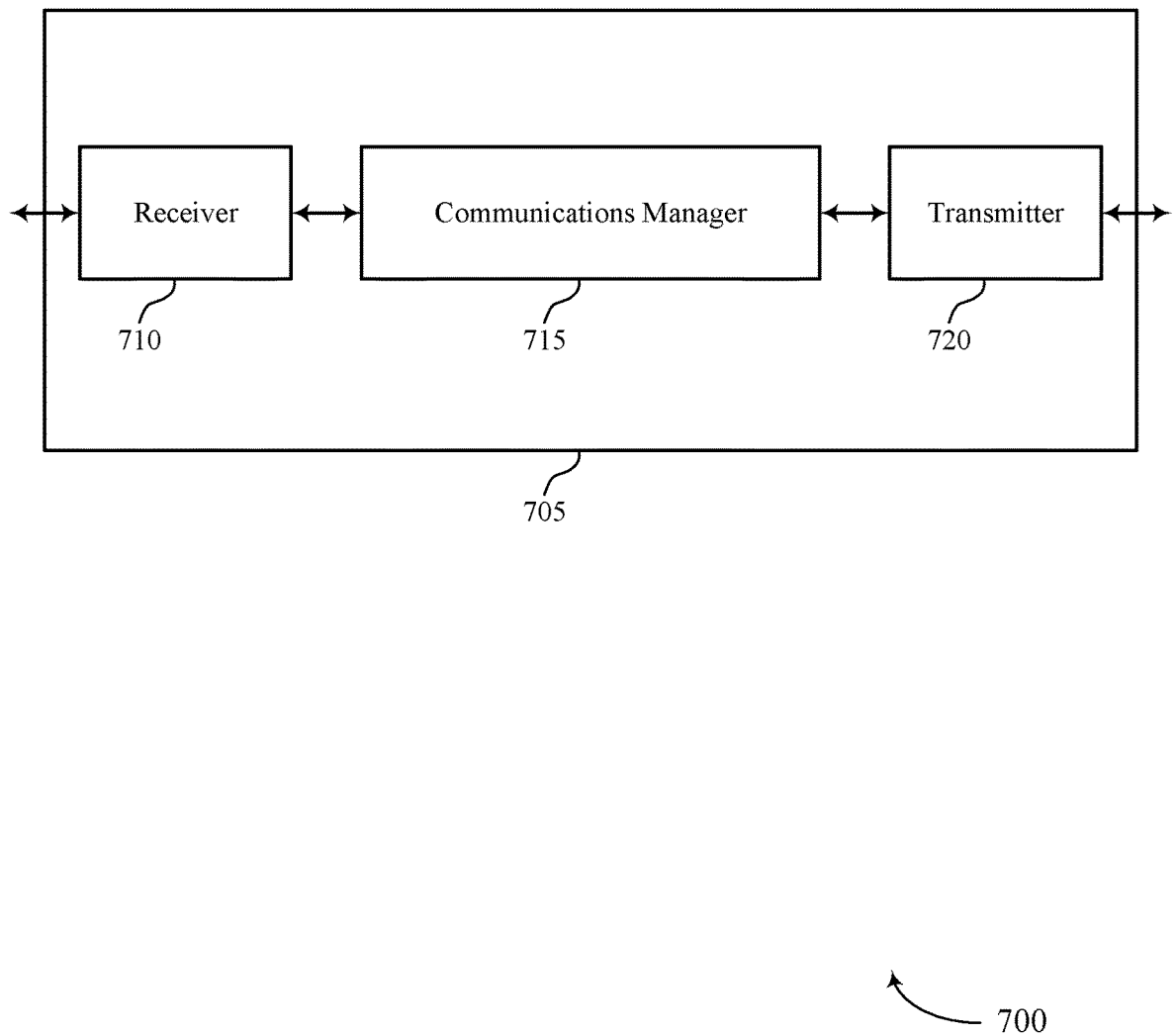
FIGS. 7 and 8 Show Block Diagrams of Devices that Support Power Saving in New Radio Multicast in Accordance with Aspects of the Present Disclosure.

FIG. 7 shows a block diagram 700 of a device 705 that supports power saving in new radio multicast in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to power saving in new radio multicast, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a multicast bandwidth part configuration for multicast communications between a base station and the UE, where the multicast bandwidth part configuration includes a maximum number of MIMO layers to be used for the multicast communications, establish a multicast link with the base station for reception of the multicast communications, determine, based on a link quality of the multicast link, to use a reduced number of antennas for reception of the multicast communications than the number of antennas used for unicast reception, and receive the multicast communications via the reduced number of antennas.

The communications manager 715 may also receive a multicast bandwidth part configuration for multicast communications between a base station and the UE, where the multicast bandwidth part configuration includes a number of repetitions or retransmissions to be used for the multicast communications, receive the multicast communications via a multicast link with the base station, determine that the UE is able to decode the multicast communications during a first portion of the number of repetitions or retransmissions prior to a remaining portion of the number of repetitions or retransmissions, and reduce radio frequency power during the remaining portion of the number of repetitions or retransmissions based on the determination that the UE is able to decode the multicast communications prior to completion of the number of repetitions or retransmissions. The communications manager 715 may be an example of aspects of the communications manager 1010 described herein.

The actions performed by the communications manager 715 as described herein may be implemented to realize one or more potential advantages. One implementation may allow a UE 115 to save power and increase battery life by powering down one or more components (e.g., antennas) during multicast reception. Another implementation may provide improved quality and reliability of service at the UE 115 as the number of separate resources allocated to the UE 115 may be reduced.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
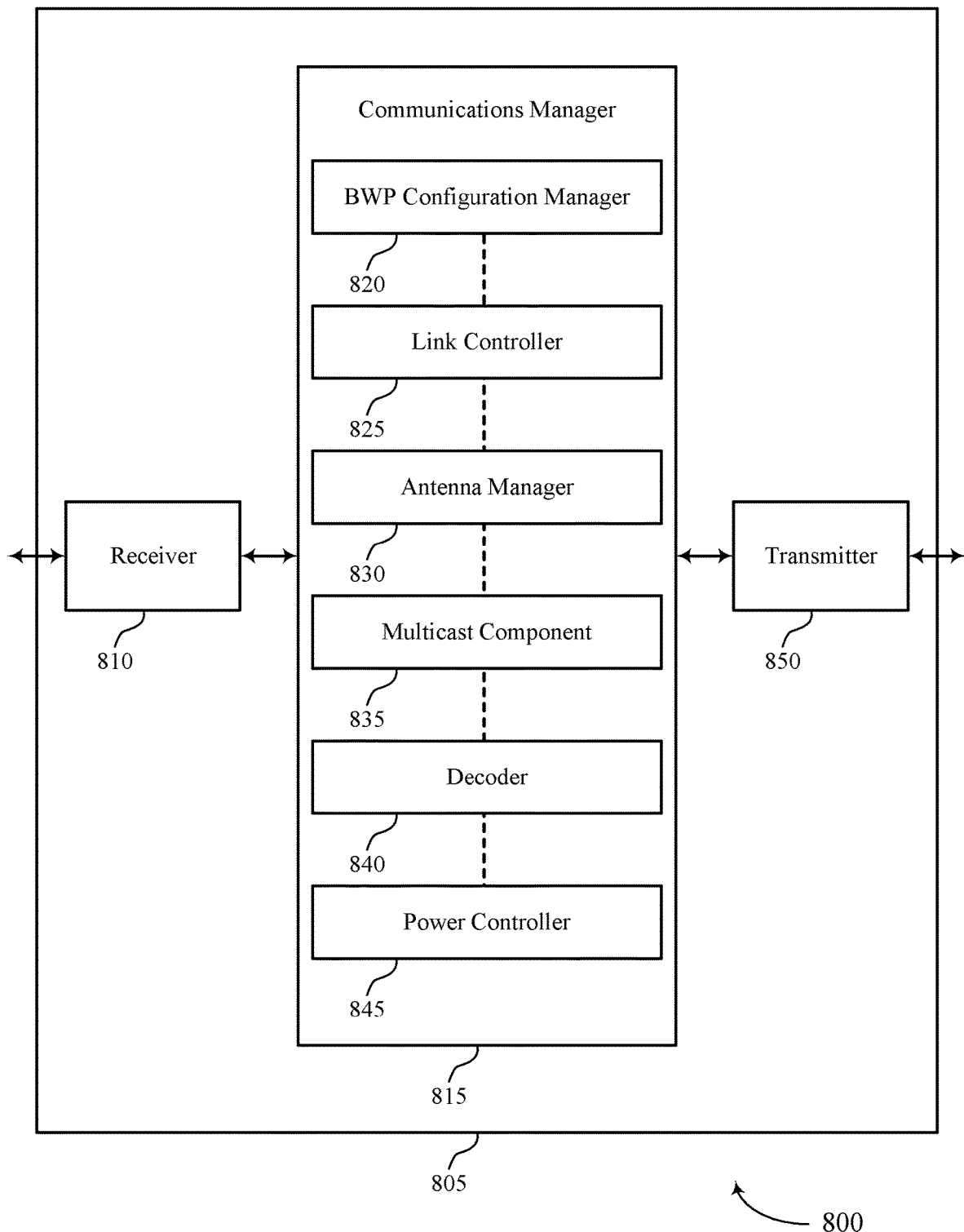

FIG. 8 shows a block diagram 800 of a device 805 that supports power saving in new radio multicast in accordance with aspects of the present disclosure. The device 805 may be an example of aspects of a device 705, or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to power saving in new radio multicast, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a BWP configuration manager 820, a link controller 825, an antenna manager 830, a multicast component 835, a decoder 840, and a power controller 845. The communications manager 815 may be an example of aspects of the communications manager 1010 described herein.

The BWP configuration manager 820 may receive a multicast bandwidth part configuration for multicast communications between a base station and the UE, where the multicast bandwidth part configuration includes a maximum number of MIMO layers to be used for the multicast communications. The BWP configuration manager 820 may receive a multicast bandwidth part configuration for multicast communications between a base station and the UE, where the multicast bandwidth part configuration includes a number of repetitions or retransmissions to be used for the multicast communications.

The link controller 825 may establish a multicast link with the base station for reception of the multicast communications.

The antenna manager 830 may determine, based on a link quality of the multicast link, to use a reduced number of antennas for reception of the multicast communications than the number of antennas used for unicast reception.

The multicast component 835 may receive the multicast communications via the reduced number of antennas. The multicast component 835 may receive the multicast communications via a multicast link with the base station.

The decoder 840 may determine that the UE is able to decode the multicast communications during a first portion of the number of repetitions or retransmissions prior to a remaining portion of the number of repetitions or retransmissions.

The power controller 845 may reduce radio frequency power during the remaining portion of the number of repetitions or retransmissions based on the determination that the UE is able to decode the multicast communications prior to completion of the number of repetitions or retransmissions.

The transmitter 850 may transmit signals generated by other components of the device 805. In some examples, the transmitter 850 may be collocated with a receiver 810 in a transceiver module. For example, the transmitter 850 may be an example of aspects of the transceiver 1020 described with reference to FIG. 10. The transmitter 850 may utilize a single antenna or a set of antennas.

Figure 9:
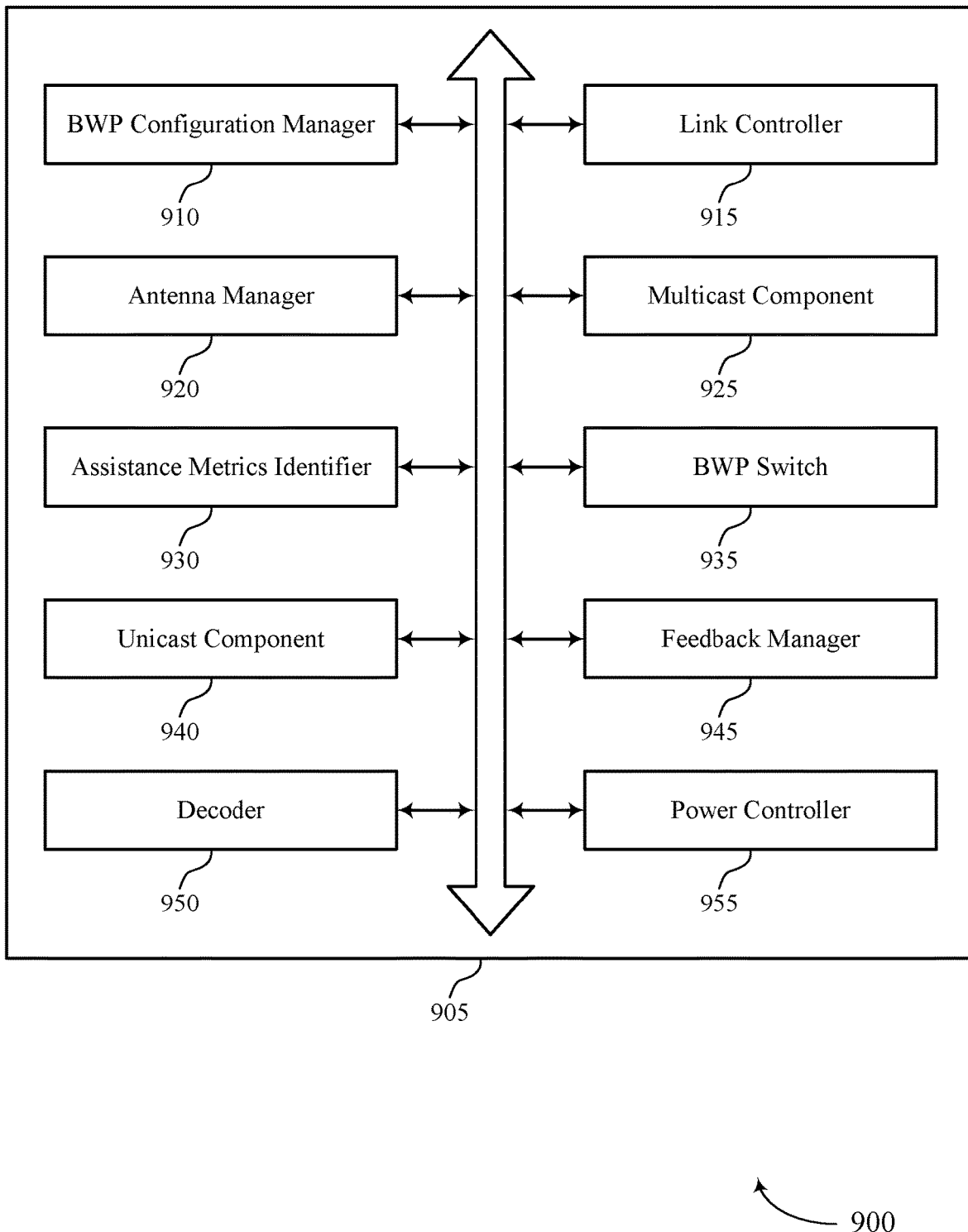
FIG. 9 shows a block diagram of a communications manager that supports power saving in new radio multicast in accordance with aspects of the present disclosure.

FIG. 9 shows a block diagram 900 of a communications manager 905 that supports power saving in new radio multicast in accordance with aspects of the present disclosure. The communications manager 905 may be an example of aspects of a communications manager 715, a communications manager 815, or a communications manager 1010 described herein. The communications manager 905 may include a BWP configuration manager 910, a link controller 915, an antenna manager 920, a multicast component 925, an assistance metrics identifier 930, a BWP switch 935, an unicast component 940, a feedback manager 945, a decoder 950, and a power controller 955. Each of these modules may communicate, directly or indirectly, with one another (e.g., via one or more buses).

The BWP configuration manager 910 may receive a multicast bandwidth part configuration for multicast communications between a base station and the UE, where the multicast bandwidth part configuration includes a maximum number of MIMO layers to be used for the multicast communications. In some examples, the BWP configuration manager 910 may receive a multicast bandwidth part configuration for multicast communications between a base station and the UE, where the multicast bandwidth part configuration includes a number of repetitions or retransmissions to be used for the multicast communications.

In some cases, the one or more multicast-specific assistance metrics are associated with the multicast bandwidth part configuration, and where different one or more multicast-specific assistance metrics are associated with a second multicast bandwidth part configuration.

The link controller 915 may establish a multicast link with the base station for reception of the multicast communications. In some examples, the link controller 915 may determine a link quality of the multicast link.

The antenna manager 920 may determine, based on a link quality of the multicast link, to use a reduced number of antennas for reception of the multicast communications than the number of antennas used for unicast reception. In some examples, the antenna manager 920 may determine to use the reduced number of antennas for reception of the multicast communications based on the one or more multicast-specific assistance metrics.

The multicast component 925 may receive the multicast communications via the reduced number of antennas. In some examples, the multicast component 925 may receive the multicast communications via a multicast link with the base station.

The assistance metrics identifier 930 may receive one or more multicast-specific assistance metrics corresponding to the multicast bandwidth part configuration. In some examples, the assistance metrics identifier 930 may receive the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof. In some examples, the assistance metrics identifier 930 may receive updated one or more multicast-specific assistance metrics corresponding to the multicast bandwidth part configuration based on a change to the number of MIMO layers or a multicast data rate to be used for the multicast communications.

In some cases, the one or more multicast-specific assistance metrics include a maximum target modulation and coding scheme, a minimum physical downlink control channel aggregation level, or a combination thereof. In some cases, the one or more multicast-specific assistance metrics include an allowed modulation and coding scheme range for a time period, an allowed physical downlink control channel aggregation level range for the time period, or a combination thereof. In some cases, the one or more multicast-specific assistance metrics include a signal quality threshold, where the signal quality threshold is based on a reference signal received power, a reference signal received quality, a layer 1 signal to interference and noise ratio, a channel state information reference signal (CSI-RS) signal to interference and noise ratio, or some combination thereof. In some cases, the one or more multicast-specific assistance metrics include a minimum channel-to-reference signal measurement ratio.

The BWP switch 935 may switch to the multicast bandwidth part configuration during a group active time period.

The decoder 950 may determine that the UE is able to decode the multicast communications during a first portion of the number of repetitions or retransmissions prior to a remaining portion of the number of repetitions or retransmissions. In some examples, the decoder 950 may determine that the UE is able to decode the multicast communications prior to completion of a number of repetitions or retransmissions of the multicast communications.

In some examples, the decoder 950 may successfully decode the multicast communications during the first portion of the number of repetitions or retransmissions prior to the remaining portion of the number of repetitions or retransmissions. In some examples, the decoder 950 may determine that the UE is able to decode the multicast communications during the first portion of the number of repetitions or retransmissions based on the link quality of the multicast link. In some examples, the decoder 950 may determine that the UE is able to decode the multicast communications during the first portion of the number of repetitions or retransmissions based on the one or more multicast-specific assistance metrics.

The power controller 955 may reduce radio frequency power during the remaining portion of the number of repetitions or retransmissions based on the determination that the UE is able to decode the multicast communications prior to completion of the number of repetitions or retransmissions.

The unicast component 940 may receive a unicast communication contemporaneously with the multicast communications, where the UE uses a consistent modulation and coding scheme and aggregation level between the unicast communication and the multicast communications.

The feedback manager 945 may transmit channel state information feedback associated with the multicast communications received via the reduced number of antennas on first resources that are separate from second resources identified for transmission of channel state information feedback associated with the multicast communications received at the UE using a number of antennas equal to or greater than the number of antennas used for unicast reception. In some examples, the feedback manager 945 may transmit multicast feedback associated with the multicast communications on opportunistic multicast feedback resources in between slots prior to completion of the number of repetitions or retransmissions based on the determination that the UE is able to decode the multicast communications prior to completion of the number of repetitions or retransmissions.

In some examples, the feedback manager 945 may transmit multicast feedback associated with the multicast communications on unicast feedback resources prior to completion of the number of repetitions or retransmissions based on the determination that the UE is able to decode the multicast communications. In some examples, the feedback manager 945 may transmit channel state information feedback, where the change to the number of MIMO layers or a multicast data rate to be used for the multicast communications is based on the channel state information feedback. In some cases, the change to the number of MIMO layers or a multicast data rate to be used for the multicast communications is based on a number of UEs receiving the multicast communications changing.

In some examples, the feedback manager 945 may receive a multicast feedback configuration that assigns multicast feedback resources interspersed with one or more repetitions or retransmissions of the number of repetitions or retransmissions. In some examples, the feedback manager 945 may transmit feedback associated with the multicast communications during the remaining portion of the number of repetitions or retransmissions based on the determination that the UE is able to decode the multicast communications prior to completion of the number of repetitions or retransmissions.

In some examples, the feedback manager 945 may transmit the feedback associated with the multicast communications on opportunistic multicast feedback resources in between slots during the remaining portion of the number of repetitions or retransmissions based on the determination that the UE is able to decode the multicast communications prior to completion of the number of repetitions or retransmissions. In some examples, the feedback manager 945 may transmit the feedback associated with the multicast communications on unicast feedback resources during the remaining portion of the number of repetitions or retransmissions based on the determination that the UE is able to decode the multicast communications prior to completion of the number of repetitions or retransmissions. In some cases, the feedback associated with the multicast communications is piggybacked with unicast feedback.

Figure 10:
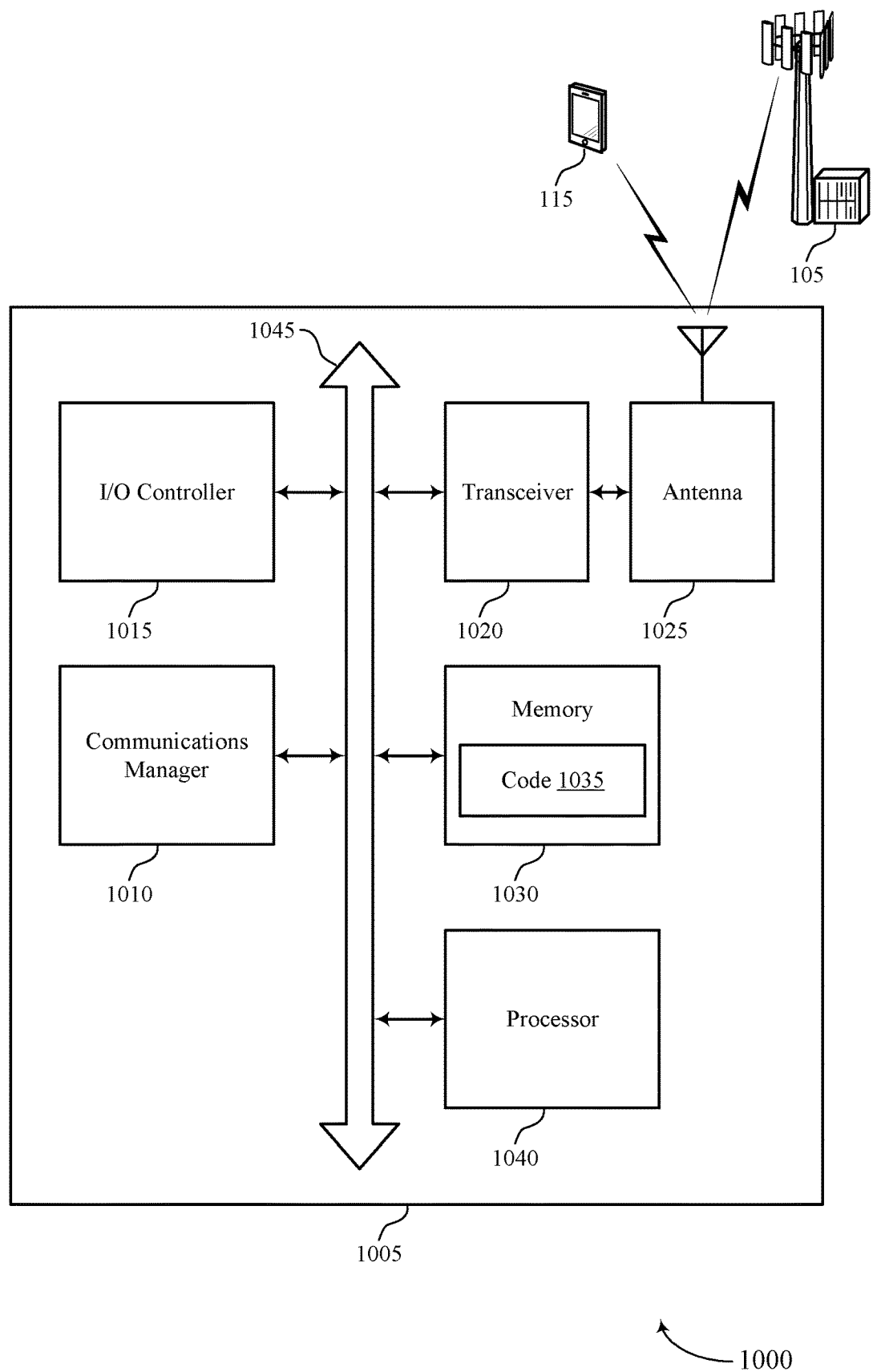
FIG. 10 shows a diagram of a system including a device that supports power saving in new radio multicast in accordance with aspects of the present disclosure.

FIG. 10 shows a diagram of a system 1000 including a device 1005 that supports power saving in new radio multicast in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a multicast bandwidth part configuration for multicast communications between a base station and the UE, where the multicast bandwidth part configuration includes a maximum number of MIMO layers to be used for the multicast communications, establish a multicast link with the base station for reception of the multicast communications, determine, based on a link quality of the multicast link, to use a reduced number of antennas for reception of the multicast communications than the number of antennas used for unicast reception, and receive the multicast communications via the reduced number of antennas. The communications manager 1010 may also receive a multicast bandwidth part configuration for multicast communications between a base station and the UE, where the multicast bandwidth part configuration includes a number of repetitions or retransmissions to be used for the multicast communications, receive the multicast communications via a multicast link with the base station, determine that the UE is able to decode the multicast communications during a first portion of the number of repetitions or retransmissions prior to a remaining portion of the number of repetitions or retransmissions, and reduce radio frequency power during the remaining portion of the number of repetitions or retransmissions based on the determination that the UE is able to decode the multicast communications prior to completion of the number of repetitions or retransmissions.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, a FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting power saving in new radio multicast). By reducing the number of receive antennas used or the number of decoding attempts during multicast reception a processor of a UE 115 the processor may respond more efficiently through the reduction of a ramp up in processing power.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
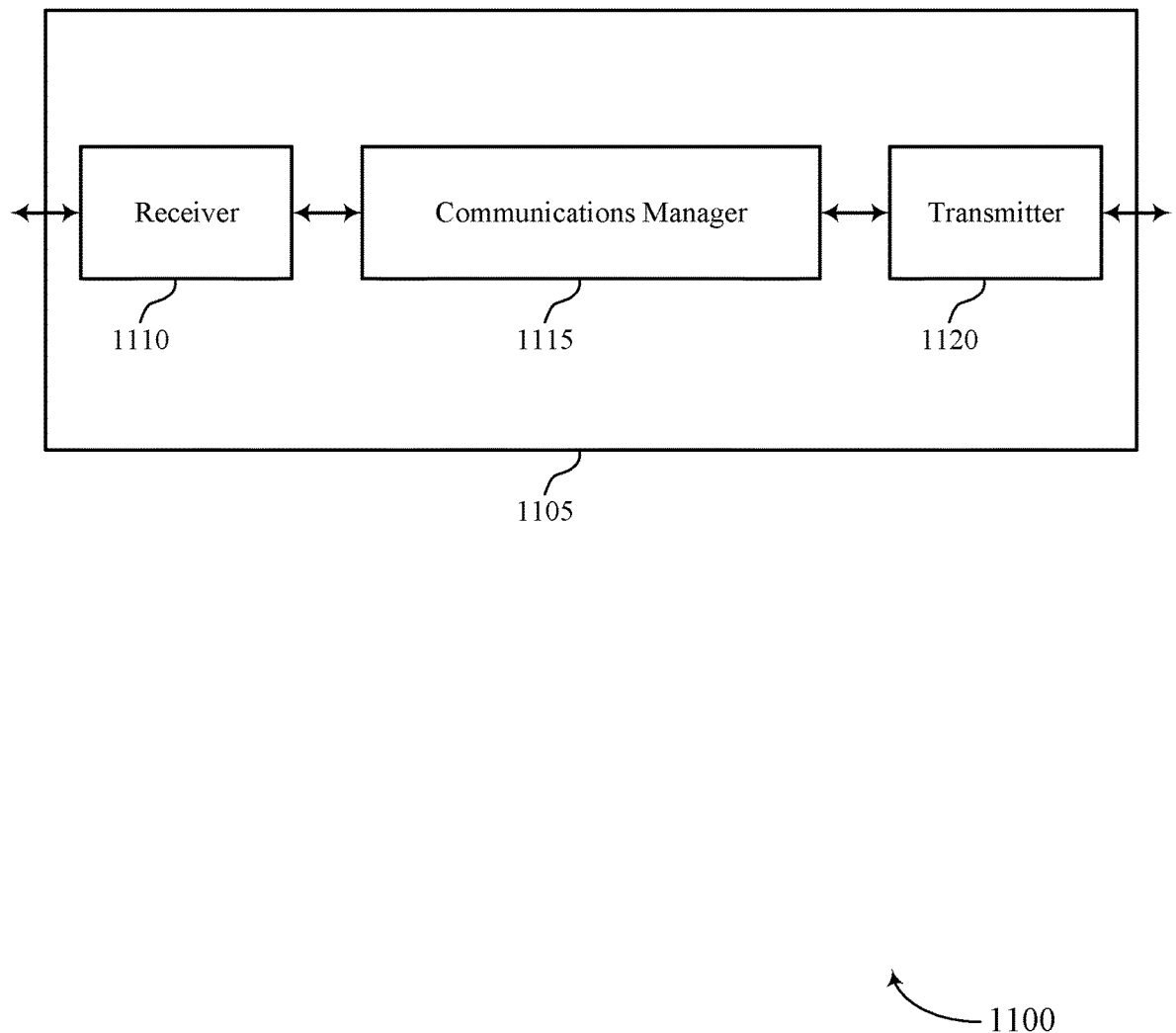
FIGS. 11 and 12 show block diagrams of devices that support power saving in new radio multicast in accordance with aspects of the present disclosure.

FIG. 11 shows a block diagram 1100 of a device 1105 that supports power saving in new radio multicast in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to power saving in new radio multicast, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a multicast bandwidth part configuration for multicast communications between the base station and a set of UEs, establish a multicast link with each of the set of UEs for transmissions of the multicast communications, transmit, to the set of UEs, one or more multicast-specific assistance metrics corresponding to the multicast bandwidth part configuration, where the one or more multicast-specific assistance metrics facilitate UE adjustment of the multicast bandwidth part configuration, and transmit, to the set of UEs, the multicast communications in accordance with the multicast bandwidth part configuration.

The communications manager 1115 may also transmit a multicast bandwidth part configuration for multicast communications between the base station and a set of UEs, where the multicast bandwidth part configuration includes a number of repetitions or retransmissions to be used for the multicast communications, transmit, to the set of UEs, one or more multicast-specific assistance metrics corresponding to the multicast bandwidth part configuration, where the one or more multicast-specific assistance metrics facilitate early UE power-down prior to completion of the number of repetitions or retransmissions, and transmit the multicast communications via a multicast link with each of the set of UEs in accordance with the multicast bandwidth part configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
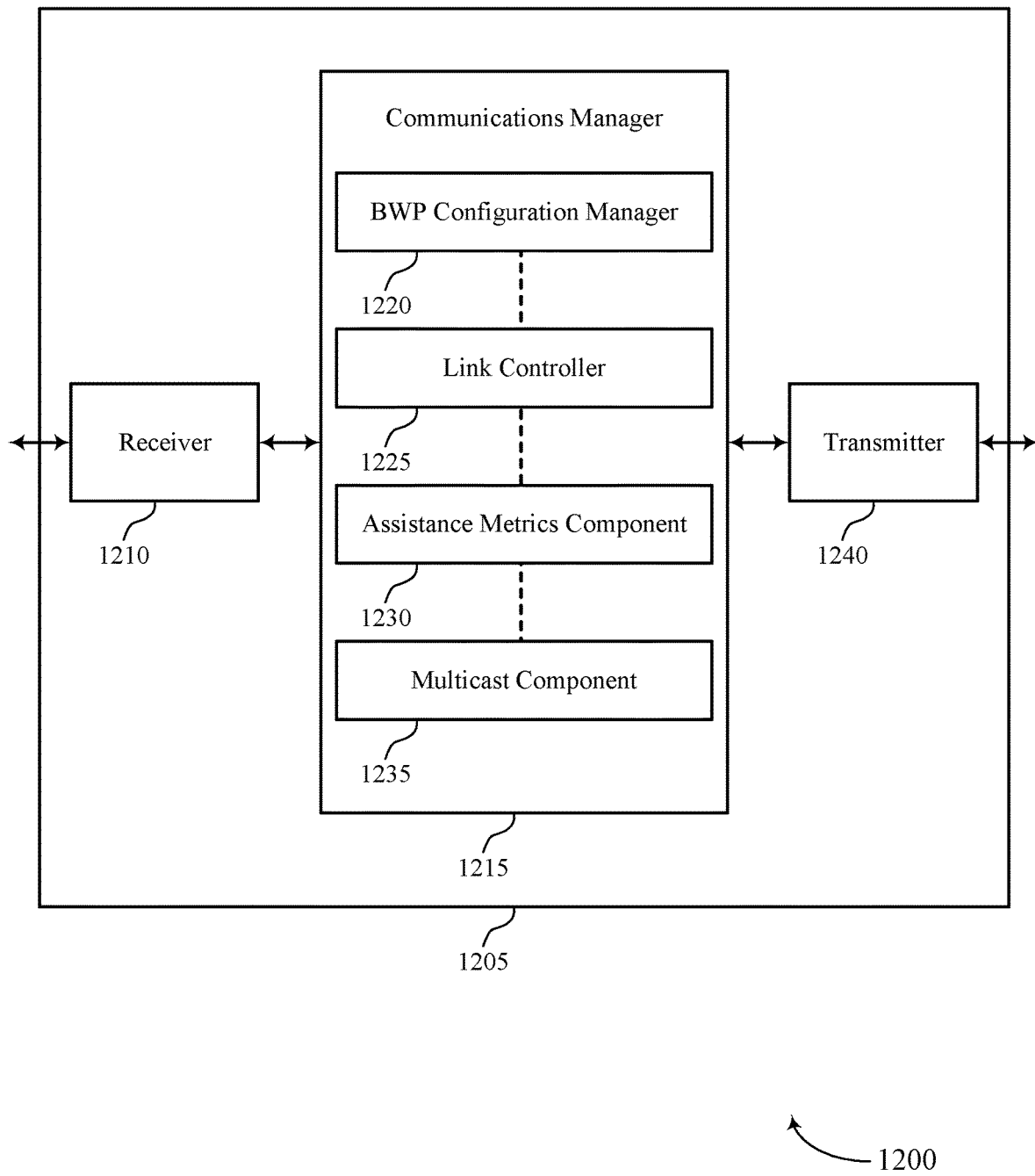

FIG. 12 shows a block diagram 1200 of a device 1205 that supports power saving in new radio multicast in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to power saving in new radio multicast, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a BWP configuration manager 1220, a link controller 1225, an assistance metrics component 1230, and a multicast component 1235. The communications manager 1215 may be an example of aspects of the communications manager 1410 described herein.

The BWP configuration manager 1220 may transmit a multicast bandwidth part configuration for multicast communications between the base station and a set of UEs. The BWP configuration manager 1220 may transmit a multicast bandwidth part configuration for multicast communications between the base station and a set of UEs, where the multicast bandwidth part configuration includes a number of repetitions or retransmissions to be used for the multicast communications.

The link controller 1225 may establish a multicast link with each of the set of UEs for transmissions of the multicast communications.

The assistance metrics component 1230 may transmit, to the set of UEs, one or more multicast-specific assistance metrics corresponding to the multicast bandwidth part configuration, where the one or more multicast-specific assistance metrics facilitate UE adjustment of the multicast bandwidth part configuration. The assistance metrics component 1230 may transmit, to the set of UEs, one or more multicast-specific assistance metrics corresponding to the multicast bandwidth part configuration, where the one or more multicast-specific assistance metrics facilitate early UE power-down prior to completion of the number of repetitions or retransmissions.

The multicast component 1235 may transmit, to the set of UEs via a multicast link with each of the set of UEs, the multicast communications in accordance with the multicast bandwidth part configuration.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
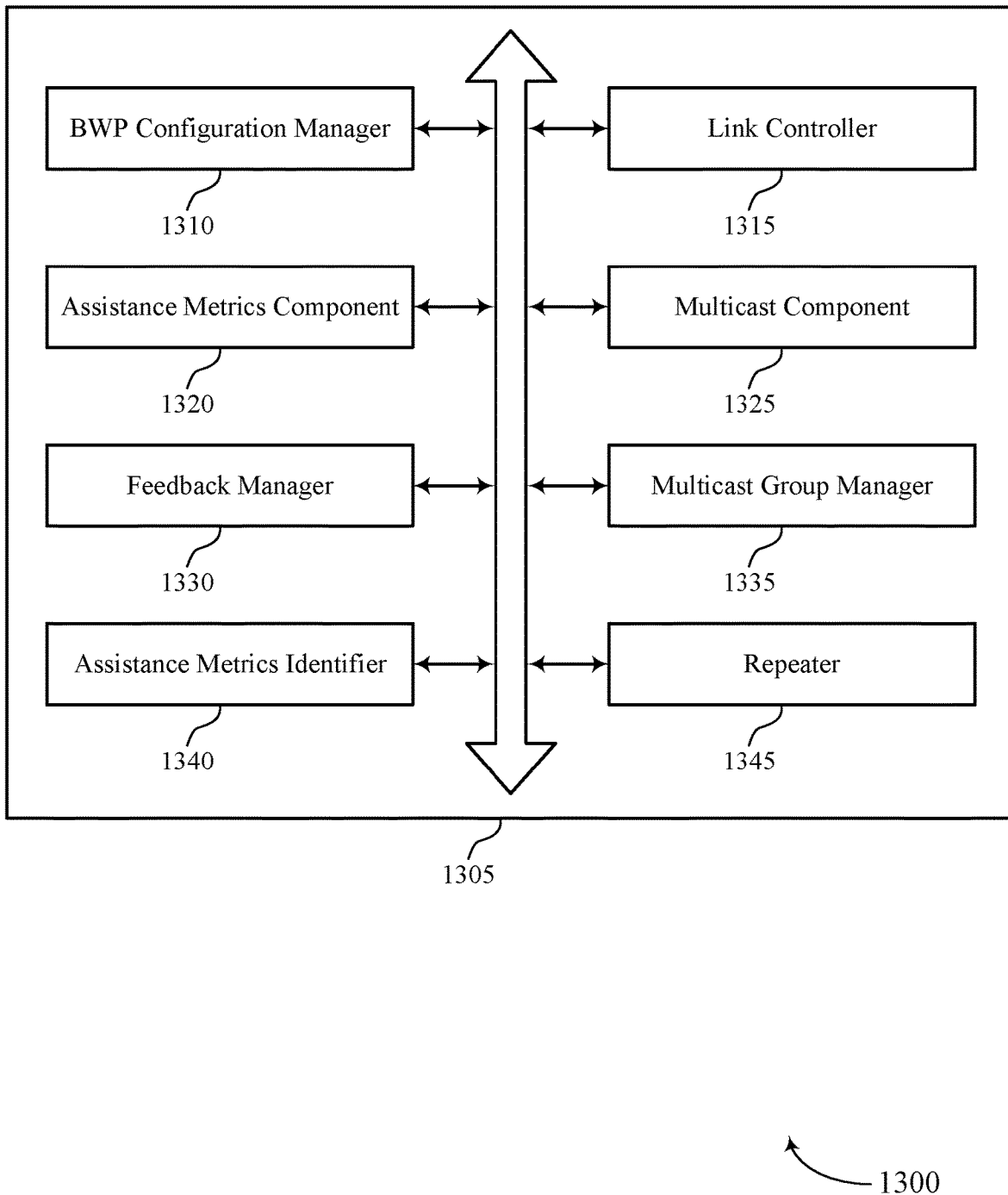
FIG. 13 shows a block diagram of a communications manager that supports power saving in new radio multicast in accordance with aspects of the present disclosure.

FIG. 13 shows a block diagram 1300 of a communications manager 1305 that supports power saving in new radio multicast in accordance with aspects of the present disclosure. The communications manager 1305 may be an example of aspects of a communications manager 1115, a communications manager 1215, or a communications manager 1410 described herein. The communications manager 1305 may include a BWP configuration manager 1310, a link controller 1315, an assistance metrics component 1320, a multicast component 1325, a feedback manager 1330, a multicast group manager 1335, an assistance metrics identifier 1340, and a repeater 1345. Each of these modules may communicate, directly or indirectly, with one another (e.g., via one or more buses).

The BWP configuration manager 1310 may transmit a multicast bandwidth part configuration for multicast communications between the base station and a set of UEs. In some examples, the BWP configuration manager 1310 may transmit a multicast bandwidth part configuration for multicast communications between the base station and a set of UEs, where the multicast bandwidth part configuration includes a number of repetitions or retransmissions to be used for the multicast communications. In some examples, the BWP configuration manager 1310 may configure a set of multicast bandwidth part configurations each with different one or more multicast-specific assistance metrics.

The link controller 1315 may establish a multicast link with each of the set of UEs for transmissions of the multicast communications.

The assistance metrics component 1320 may transmit, to the set of UEs, one or more multicast-specific assistance metrics corresponding to the multicast bandwidth part configuration, where the one or more multicast-specific assistance metrics facilitate UE adjustment of the multicast bandwidth part configuration. In some examples, the assistance metrics component 1320 may transmit, to the set of UEs, one or more multicast-specific assistance metrics corresponding to the multicast bandwidth part configuration, where the one or more multicast-specific assistance metrics facilitate early UE power-down prior to completion of the number of repetitions or retransmissions.

In some examples, the assistance metrics component 1320 may transmit, to the set of UEs, the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof. In some examples, the assistance metrics component 1320 may transmit updated one or more multicast-specific assistance metrics corresponding to the multicast bandwidth part configuration based on the channel state information feedback.

In some examples, the assistance metrics component 1320 may transmit updated one or more multicast-specific assistance metrics corresponding to the number of MIMO layers or a multicast data rate to be used for the multicast communications. In some examples, the assistance metrics component 1320 may transmit, to the set of UEs, the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

In some cases, the one or more multicast-specific assistance metrics include a maximum target modulation and coding scheme, a minimum physical downlink control channel aggregation level, or a combination thereof. In some cases, the one or more multicast-specific assistance metrics include an allowed modulation and coding scheme range for a time period, an allowed physical downlink control channel aggregation level range for the time period, or a combination thereof. In some cases, the one or more multicast-specific assistance metrics include a signal quality threshold, where the signal quality threshold is based on a reference signal received power, a reference signal received quality, a layer 1 signal to interference and noise ratio, a channel state information reference signal (CSI-RS) signal to interference and noise ratio, or some combination thereof. In some cases, the one or more multicast-specific assistance metrics include a minimum channel-to-reference signal measurement ratio. In some cases, the multicast-specific assistance metrics are multicast service specific.

The multicast component 1325 may transmit, to the set of UEs via a multicast link with each of the set of UEs, the multicast communications in accordance with the multicast bandwidth part configuration.

The feedback manager 1330 may receive channel state information feedback from a UE of the set of UEs. In some examples, the feedback manager 1330 may receive feedback associated with the multicast communications prior to completion of the number of repetitions or retransmissions. In some examples, the feedback manager 1330 may receive multicast feedback associated with the multicast communications on opportunistic multicast feedback resources in between slots prior to completion of the number of repetitions or retransmissions based on the UE being able to decode the multicast communications prior to completion of the number of repetitions or retransmissions. In some examples, the feedback manager 1330 may transmit a multicast feedback configuration that assigns multicast feedback resources interspersed with one or more repetitions or retransmissions of the number of repetitions or retransmissions. In some examples, the feedback manager 1330 may receive multicast feedback associated with the multicast communications on unicast feedback resources prior to completion of the number of repetitions or retransmissions based on the UE being able to decode the multicast communications prior to completion of the number of repetitions or retransmissions. In some cases, the feedback associated with the multicast communications is piggybacked with unicast feedback.

The multicast group manager 1335 may identify a change in a number of UEs receiving the multicast communications. The assistance metrics identifier 1340 may change a number of MIMO layers or a multicast data rate to be used for the multicast communications based on the change.

The repeater 1345 may transmit a number of repetitions or retransmissions of the multicast communications.

Figure 14:
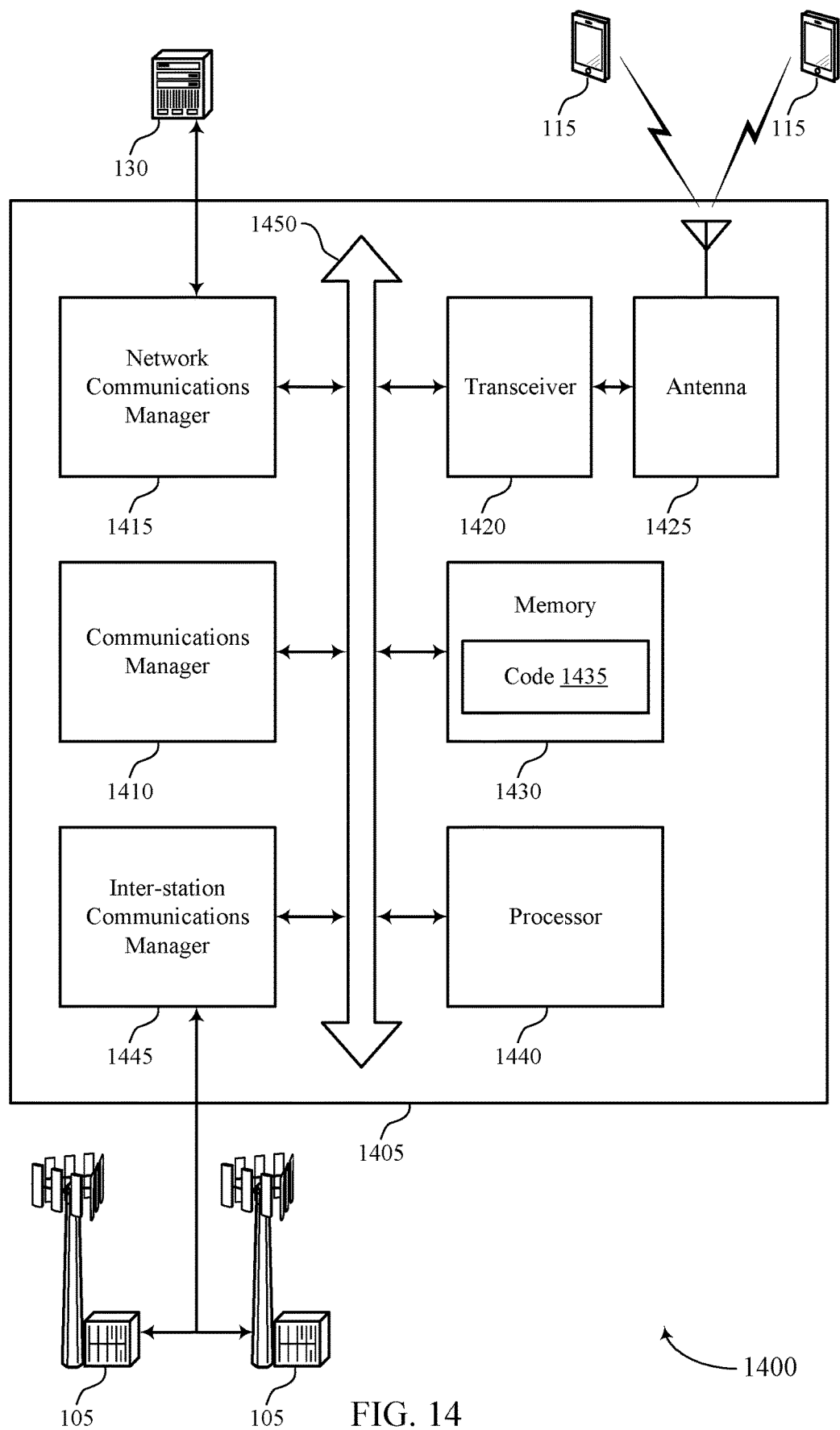
FIG. 14 shows a diagram of a system including a device that supports power saving in new radio multicast in accordance with aspects of the present disclosure.

FIG. 14 shows a diagram of a system 1400 including a device 1405 that supports power saving in new radio multicast in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a multicast bandwidth part configuration for multicast communications between the base station and a set of user equipments (UEs), establish a multicast link with each of the set of UEs for transmissions of the multicast communications, transmit, to the set of UEs, one or more multicast-specific assistance metrics corresponding to the multicast bandwidth part configuration, where the one or more multicast-specific assistance metrics facilitate UE adjustment of the multicast bandwidth part configuration, and transmit, to the set of UEs, the multicast communications in accordance with the multicast bandwidth part configuration. The communications manager 1410 may also transmit a multicast bandwidth part configuration for multicast communications between the base station and a set of user equipments (UEs), where the multicast bandwidth part configuration includes a number of repetitions or retransmissions to be used for the multicast communications, transmit, to the set of UEs, one or more multicast-specific assistance metrics corresponding to the multicast bandwidth part configuration, where the one or more multicast-specific assistance metrics facilitate early UE power-down prior to completion of the number of repetitions or retransmissions, and transmit the multicast communications via a multicast link with each of the set of UEs in accordance with the multicast bandwidth part configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting power saving in new radio multicast).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
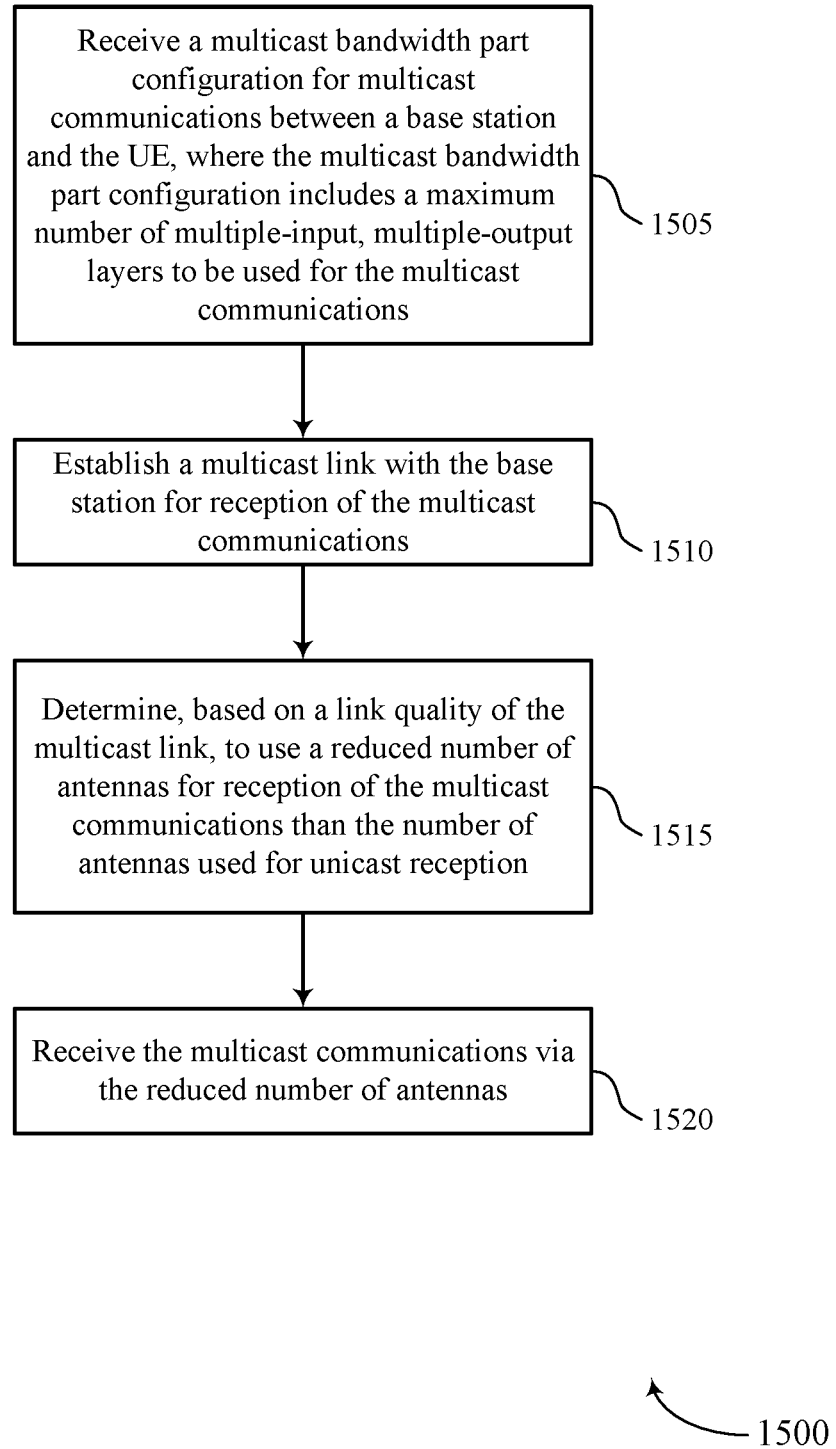
FIGS. 15 through 22 show flowcharts illustrating methods that support power saving in new radio multicast in accordance with aspects of the present disclosure.

FIG. 15 shows a flowchart illustrating a method 1500 that supports power saving in new radio multicast in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a multicast bandwidth part configuration for multicast communications between a base station and the UE, where the multicast bandwidth part configuration includes a maximum number of MIMO layers to be used for the multicast communications. The operations of 1505 may be performed according to the methods described herein. In some examples, aspects of the operations of 1505 may be performed by a BWP configuration manager as described with reference to FIGS. 7 through 10.

At 1510, the UE may establish a multicast link with the base station for reception of the multicast communications. The operations of 1510 may be performed according to the methods described herein. In some examples, aspects of the operations of 1510 may be performed by a link controller as described with reference to FIGS. 7 through 10.

At 1515, the UE may determine, based on a link quality of the multicast link, to use a reduced number of antennas for reception of the multicast communications than the number of antennas used for unicast reception. The operations of 1515 may be performed according to the methods described herein. In some examples, aspects of the operations of 1515 may be performed by an antenna manager as described with reference to FIGS. 7 through 10.

At 1520, the UE may receive the multicast communications via the reduced number of antennas. The operations of 1520 may be performed according to the methods described herein. In some examples, aspects of the operations of 1520 may be performed by a multicast component as described with reference to FIGS. 7 through 10.

Figure 16:
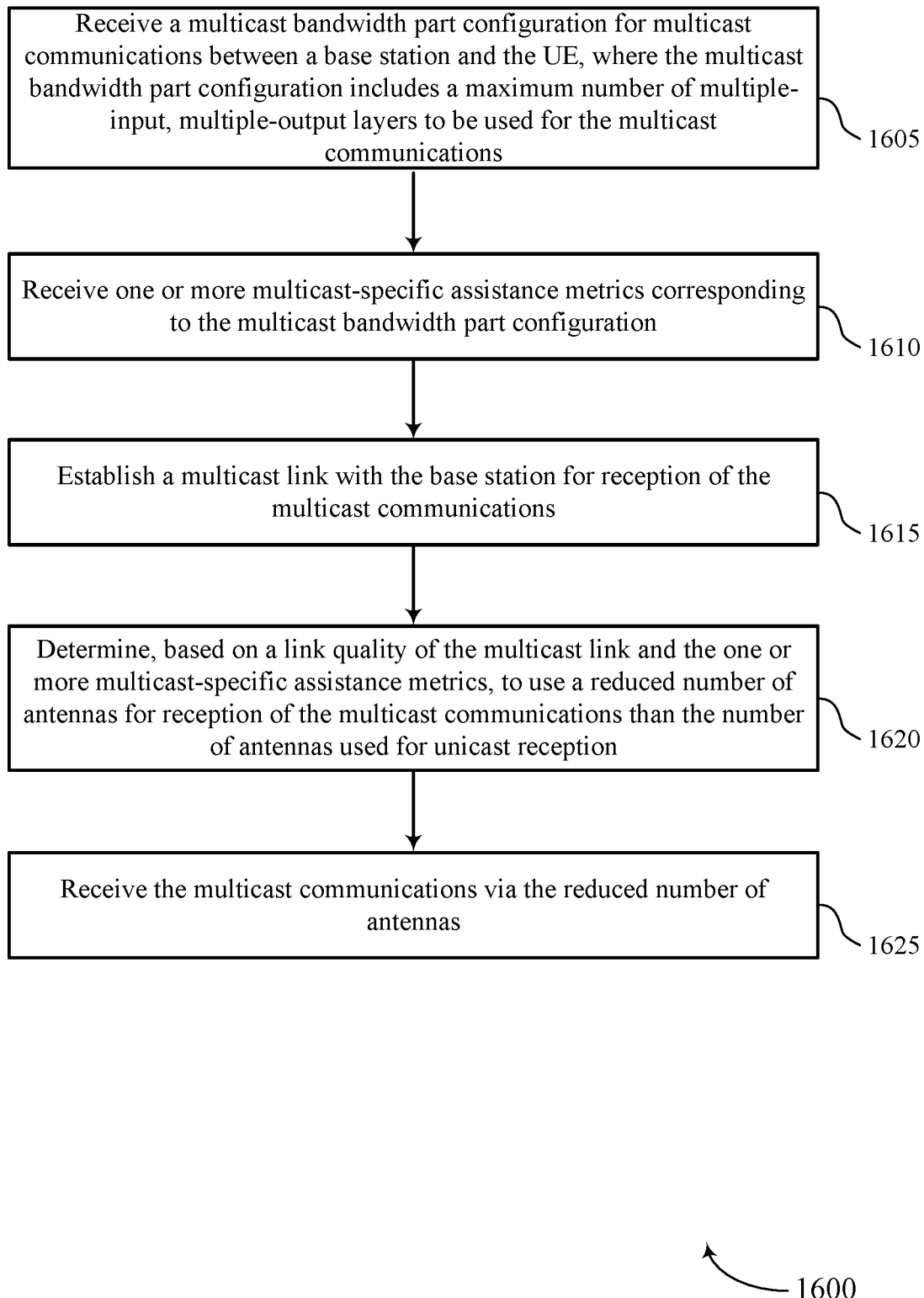

FIG. 16 shows a flowchart illustrating a method 1600 that supports power saving in new radio multicast in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a multicast bandwidth part configuration for multicast communications between a base station and the UE, where the multicast bandwidth part configuration includes a maximum number of MIMO layers to be used for the multicast communications. The operations of 1605 may be performed according to the methods described herein. In some examples, aspects of the operations of 1605 may be performed by a BWP configuration manager as described with reference to FIGS. 7 through 10.

At 1610, the UE may receive one or more multicast-specific assistance metrics corresponding to the multicast bandwidth part configuration. The operations of 1610 may be performed according to the methods described herein. In some examples, aspects of the operations of 1610 may be performed by an assistance metrics identifier as described with reference to FIGS. 7 through 10.

At 1615, the UE may establish a multicast link with the base station for reception of the multicast communications. The operations of 1615 may be performed according to the methods described herein. In some examples, aspects of the operations of 1615 may be performed by a link controller as described with reference to FIGS. 7 through 10.

At 1620, the UE may determine, based on a link quality of the multicast link and the one or more multicast-specific assistance metrics, to use a reduced number of antennas for reception of the multicast communications than the number of antennas used for unicast reception. The operations of 1620 may be performed according to the methods described herein. In some examples, aspects of the operations of 1620 may be performed by an antenna manager as described with reference to FIGS. 7 through 10.

At 1625, the UE may receive the multicast communications via the reduced number of antennas. The operations of 1625 may be performed according to the methods described herein. In some examples, aspects of the operations of 1630 may be performed by a multicast component as described with reference to FIGS. 7 through 10.

Figure 17:
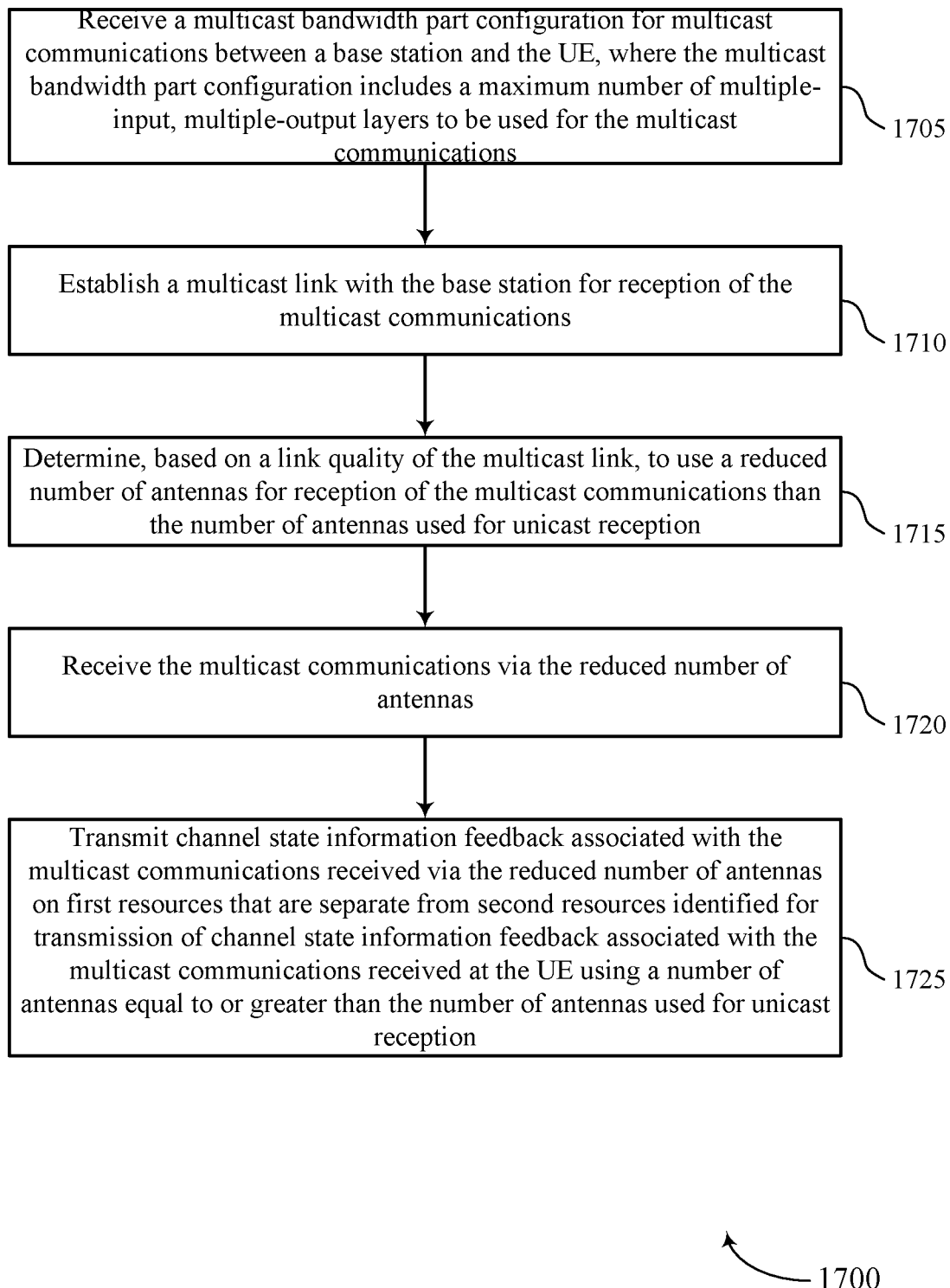

FIG. 17 shows a flowchart illustrating a method 1700 that supports power saving in new radio multicast in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a multicast bandwidth part configuration for multicast communications between a base station and the UE, where the multicast bandwidth part configuration includes a maximum number of MIMO layers to be used for the multicast communications. The operations of 1705 may be performed according to the methods described herein. In some examples, aspects of the operations of 1705 may be performed by a BWP configuration manager as described with reference to FIGS. 7 through 10.

At 1710, the UE may establish a multicast link with the base station for reception of the multicast communications. The operations of 1710 may be performed according to the methods described herein. In some examples, aspects of the operations of 1710 may be performed by a link controller as described with reference to FIGS. 7 through 10.

At 1715, the UE may determine, based on a link quality of the multicast link, to use a reduced number of antennas for reception of the multicast communications than the number of antennas used for unicast reception. The operations of 1715 may be performed according to the methods described herein. In some examples, aspects of the operations of 1715 may be performed by an antenna manager as described with reference to FIGS. 7 through 10.

At 1720, the UE may receive the multicast communications via the reduced number of antennas. The operations of 1720 may be performed according to the methods described herein. In some examples, aspects of the operations of 1720 may be performed by a multicast component as described with reference to FIGS. 7 through 10.

At 1725, the UE may transmit channel state information feedback associated with the multicast communications received via the reduced number of antennas on first resources that are separate from second resources identified for transmission of channel state information feedback associated with the multicast communications received at the UE using a number of antennas equal to or greater than the number of antennas used for unicast reception. The operations of 1725 may be performed according to the methods described herein. In some examples, aspects of the operations of 1725 may be performed by a feedback manager as described with reference to FIGS. 7 through 10.

Figure 18:
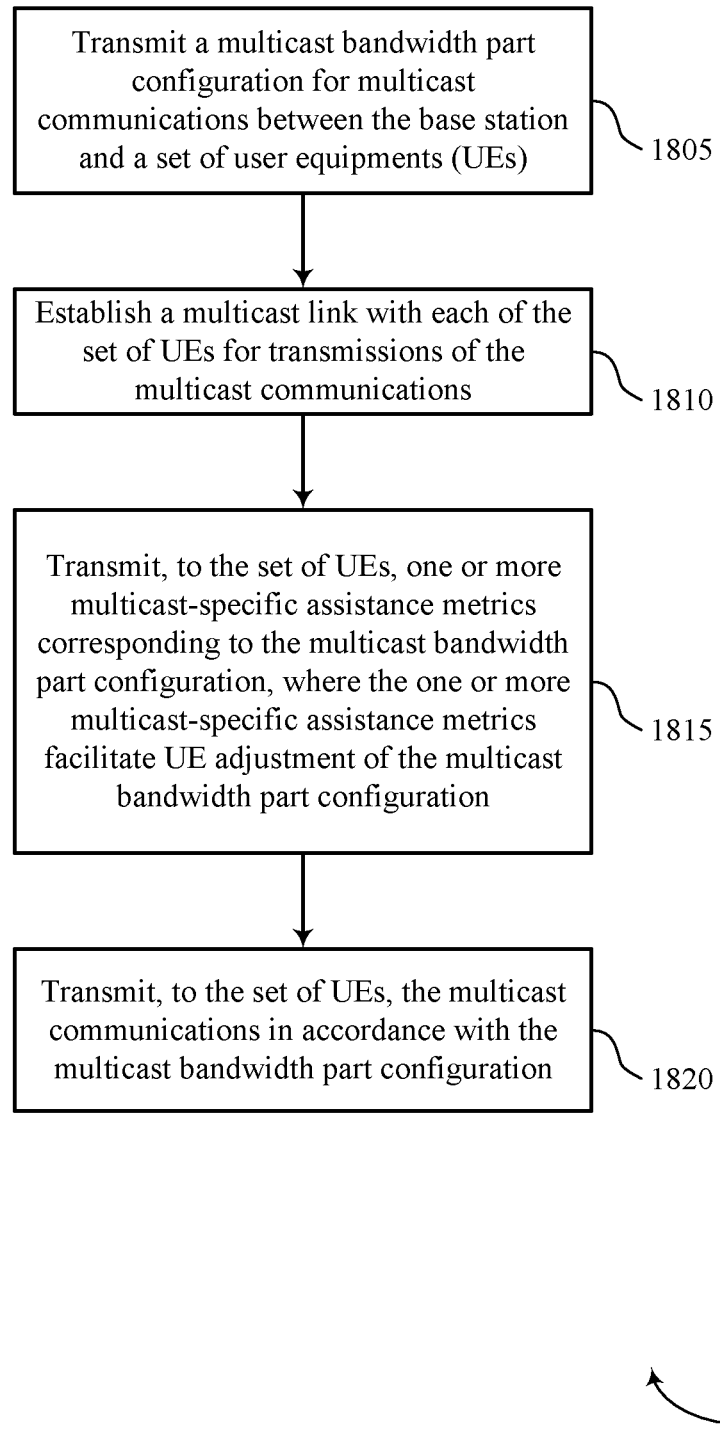

FIG. 18 shows a flowchart illustrating a method 1800 that supports power saving in new radio multicast in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit a multicast bandwidth part configuration for multicast communications between the base station and a set of user equipments (UEs). The operations of 1805 may be performed according to the methods described herein. In some examples, aspects of the operations of 1805 may be performed by a BWP configuration manager as described with reference to FIGS. 11 through 14.

At 1810, the base station may establish a multicast link with each of the set of UEs for transmissions of the multicast communications. The operations of 1810 may be performed according to the methods described herein. In some examples, aspects of the operations of 1810 may be performed by a link controller as described with reference to FIGS. 11 through 14.

At 1815, the base station may transmit, to the set of UEs, one or more multicast-specific assistance metrics corresponding to the multicast bandwidth part configuration, where the one or more multicast-specific assistance metrics facilitate UE adjustment of the multicast bandwidth part configuration. The operations of 1815 may be performed according to the methods described herein. In some examples, aspects of the operations of 1815 may be performed by an assistance metrics component as described with reference to FIGS. 11 through 14.

At 1820, the base station may transmit, to the set of UEs, the multicast communications in accordance with the multicast bandwidth part configuration. The operations of 1820 may be performed according to the methods described herein. In some examples, aspects of the operations of 1820 may be performed by a multicast component as described with reference to FIGS. 11 through 14.

Figure 19:
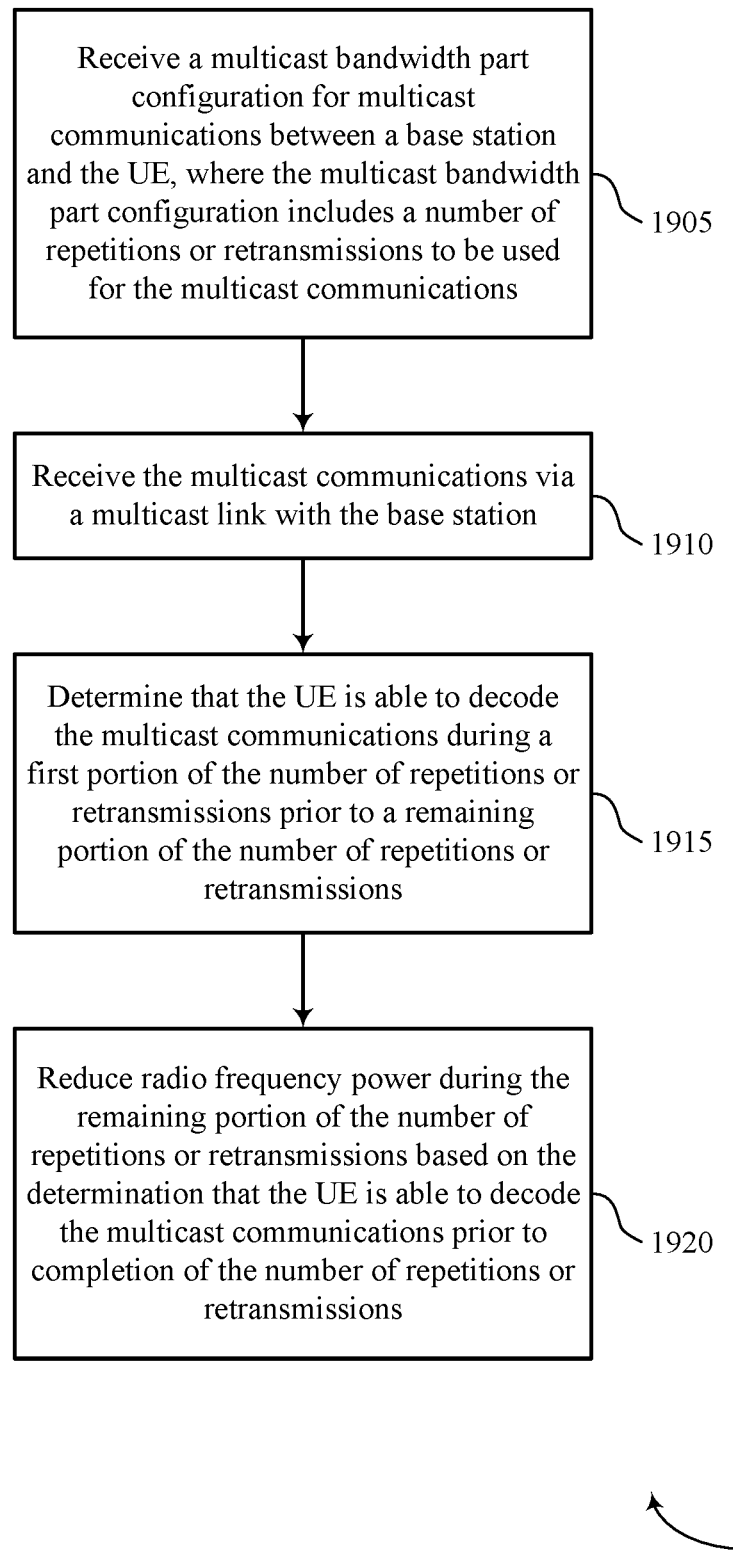

FIG. 19 shows a flowchart illustrating a method 1900 that supports power saving in new radio multicast in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may receive a multicast bandwidth part configuration for multicast communications between a base station and the UE, where the multicast bandwidth part configuration includes a number of repetitions or retransmissions to be used for the multicast communications. The operations of 1905 may be performed according to the methods described herein. In some examples, aspects of the operations of 1905 may be performed by a BWP configuration manager as described with reference to FIGS. 7 through 10.

At 1910, the UE may receive the multicast communications via a multicast link with the base station. The operations of 1910 may be performed according to the methods described herein. In some examples, aspects of the operations of 1910 may be performed by a multicast component as described with reference to FIGS. 7 through 10.

At 1915, the UE may determine that the UE is able to decode the multicast communications during a first portion of the number of repetitions or retransmissions prior to a remaining portion of the number of repetitions or retransmissions. The operations of 1915 may be performed according to the methods described herein. In some examples, aspects of the operations of 1915 may be performed by a decoder as described with reference to FIGS. 7 through 10.

At 1920, the UE may reduce radio frequency power during the remaining portion of the number of repetitions or retransmissions based on the determination that the UE is able to decode the multicast communications prior to completion of the number of repetitions or retransmissions. The operations of 1920 may be performed according to the methods described herein. In some examples, aspects of the operations of 1920 may be performed by a power controller as described with reference to FIGS. 7 through 10.

Figure 20:
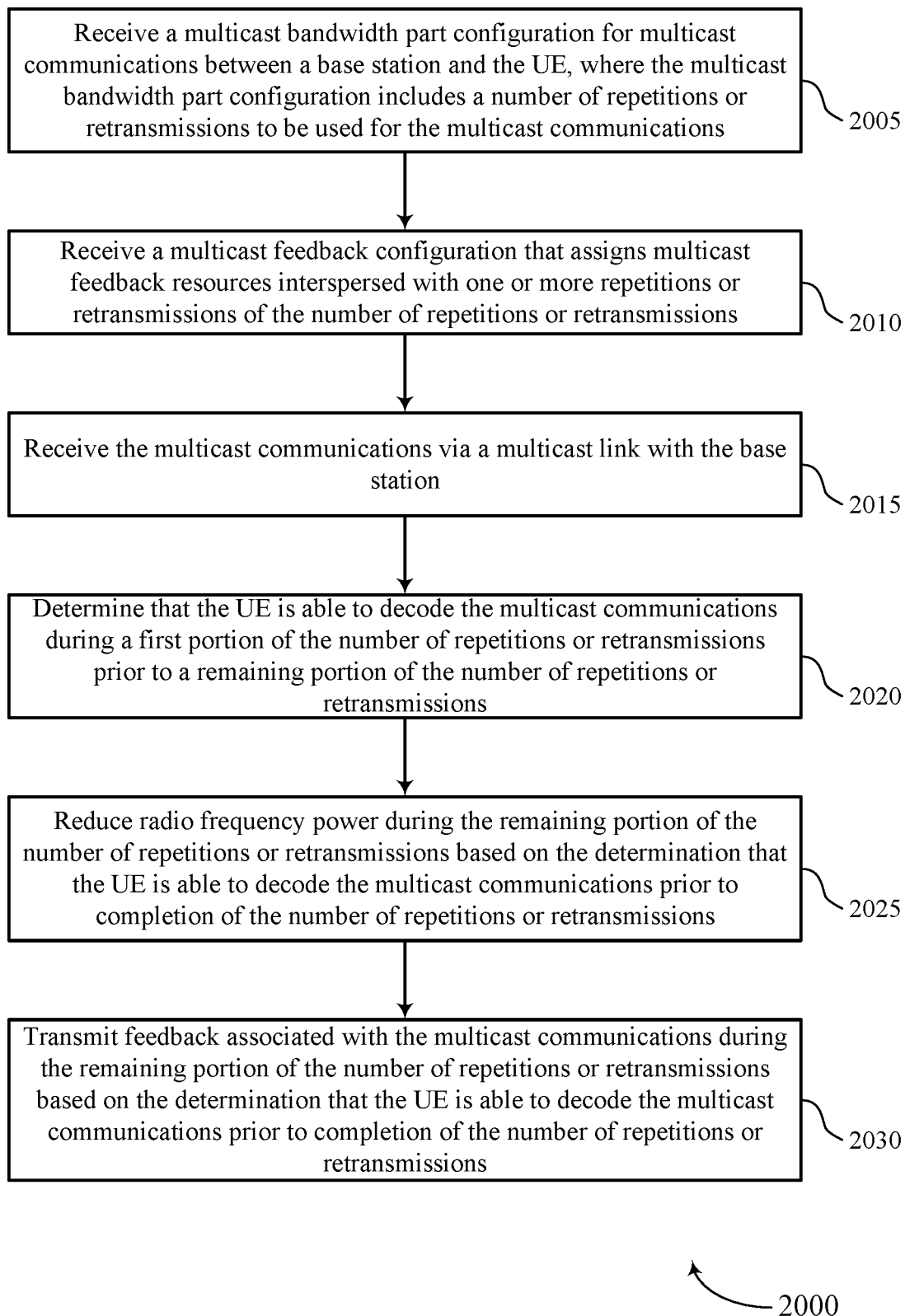

FIG. 20 shows a flowchart illustrating a method 2000 that supports power saving in new radio multicast in accordance with aspects of the present disclosure. The operations of method 2000 may be implemented by a UE 115 or its components as described herein. For example, the operations of method 2000 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2005, the UE may receive a multicast bandwidth part configuration for multicast communications between a base station and the UE, where the multicast bandwidth part configuration includes a number of repetitions or retransmissions to be used for the multicast communications. The operations of 2005 may be performed according to the methods described herein. In some examples, aspects of the operations of 2005 may be performed by a BWP configuration manager as described with reference to FIGS. 7 through 10.

At 2010, the UE may receive a multicast feedback configuration that assigns multicast feedback resources interspersed with one or more repetitions or retransmissions of the number of repetitions or retransmissions. The operations of 2010 may be performed according to the methods described herein. In some examples, aspects of the operations of 2010 may be performed by a feedback manager as described with reference to FIGS. 7 through 10.

At 2015, the UE may receive the multicast communications via a multicast link with the base station. The operations of 2015 may be performed according to the methods described herein. In some examples, aspects of the operations of 2015 may be performed by a multicast component as described with reference to FIGS. 7 through 10.

At 2020, the UE may determine that the UE is able to decode the multicast communications during a first portion of the number of repetitions or retransmissions prior to a remaining portion of the number of repetitions or retransmissions. The operations of 2020 may be performed according to the methods described herein. In some examples, aspects of the operations of 2020 may be performed by a decoder as described with reference to FIGS. 7 through 10.

At 2025, the UE may reduce radio frequency power during the remaining portion of the number of repetitions or retransmissions based on the determination that the UE is able to decode the multicast communications prior to completion of the number of repetitions or retransmissions. The operations of 2025 may be performed according to the methods described herein. In some examples, aspects of the operations of 2025 may be performed by a power controller as described with reference to FIGS. 7 through 10.

At 2030, the UE may transmit feedback associated with the multicast communications during the remaining portion of the number of repetitions or retransmissions based on the determination that the UE is able to decode the multicast communications prior to completion of the number of repetitions or retransmissions. The operations of 2030 may be performed according to the methods described herein. In some examples, aspects of the operations of 2030 may be performed by a feedback manager as described with reference to FIGS. 7 through 10.

Figure 21:
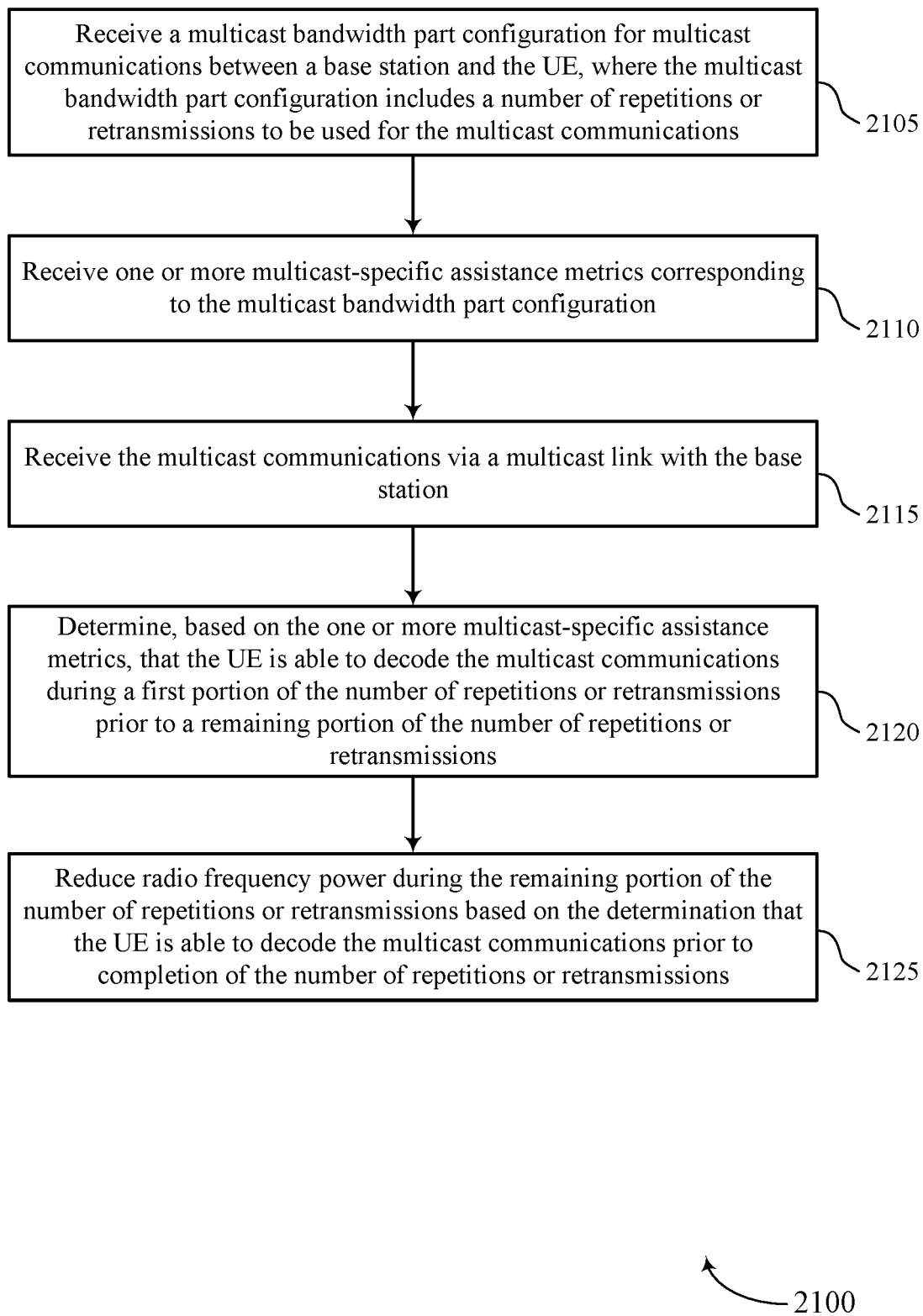

FIG. 21 shows a flowchart illustrating a method 2100 that supports power saving in new radio multicast in accordance with aspects of the present disclosure. The operations of method 2100 may be implemented by a UE 115 or its components as described herein. For example, the operations of method 2100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2105, the UE may receive a multicast bandwidth part configuration for multicast communications between a base station and the UE, where the multicast bandwidth part configuration includes a number of repetitions or retransmissions to be used for the multicast communications. The operations of 2105 may be performed according to the methods described herein. In some examples, aspects of the operations of 2105 may be performed by a BWP configuration manager as described with reference to FIGS. 7 through 10.

At 2110, the UE may receive one or more multicast-specific assistance metrics corresponding to the multicast bandwidth part configuration. The operations of 2110 may be performed according to the methods described herein. In some examples, aspects of the operations of 2110 may be performed by an assistance metrics identifier as described with reference to FIGS. 7 through 10.

At 2115, the UE may receive the multicast communications via a multicast link with the base station. The operations of 2115 may be performed according to the methods described herein. In some examples, aspects of the operations of 2115 may be performed by a multicast component as described with reference to FIGS. 7 through 10.

At 2120, the UE may determine, based on the one or more multicast-specific assistance metrics, that the UE is able to decode the multicast communications during a first portion of the number of repetitions or retransmissions prior to a remaining portion of the number of repetitions or retransmissions. The operations of 2120 may be performed according to the methods described herein. In some examples, aspects of the operations of 2120 may be performed by a decoder as described with reference to FIGS. 7 through 10.

At 2125, the UE may reduce radio frequency power during the remaining portion of the number of repetitions or retransmissions based on the determination that the UE is able to decode the multicast communications prior to completion of the number of repetitions or retransmissions. The operations of 2125 may be performed according to the methods described herein. In some examples, aspects of the operations of 2125 may be performed by a power controller as described with reference to FIGS. 7 through 10.

Figure 22:
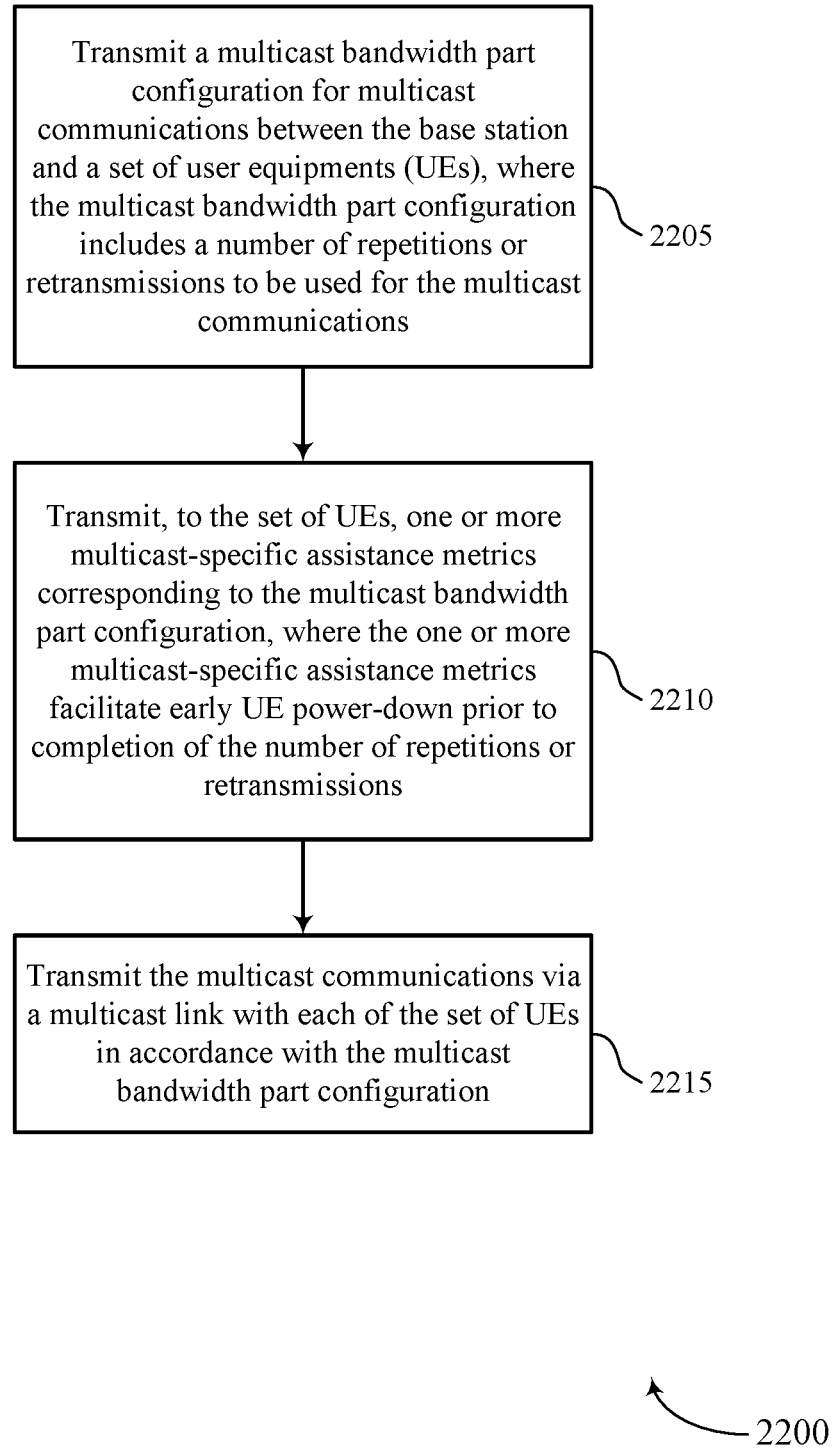

FIG. 22 shows a flowchart illustrating a method 2200 that supports power saving in new radio multicast in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may transmit a multicast bandwidth part configuration for multicast communications between the base station and a set of user equipments (UEs), where the multicast bandwidth part configuration includes a number of repetitions or retransmissions to be used for the multicast communications. The operations of 2205 may be performed according to the methods described herein. In some examples, aspects of the operations of 2205 may be performed by a BWP configuration manager as described with reference to FIGS. 11 through 14.

At 2210, the base station may transmit, to the set of UEs, one or more multicast-specific assistance metrics corresponding to the multicast bandwidth part configuration, where the one or more multicast-specific assistance metrics facilitate early UE power-down prior to completion of the number of repetitions or retransmissions. The operations of 2210 may be performed according to the methods described herein. In some examples, aspects of the operations of 2210 may be performed by an assistance metrics component as described with reference to FIGS. 11 through 14.

At 2215, the base station may transmit the multicast communications via a multicast link with each of the set of UEs in accordance with the multicast bandwidth part configuration. The operations of 2215 may be performed according to the methods described herein. In some examples, aspects of the operations of 2215 may be performed by a multicast component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Example 1: A method for wireless communication at a user equipment (UE), comprising: receiving a multicast bandwidth part configuration for multicast communications between a base station and the UE, wherein the multicast bandwidth part configuration includes a maximum number of multiple-input, multiple-output layers to be used for the multicast communications; establishing a multicast link with the base station for reception of the multicast communications; determining, based at least in part on a link quality of the multicast link, to use a reduced number of antennas for reception of the multicast communications than a number of antennas used for unicast reception; and receiving the multicast communications via the reduced number of antennas.

Example 2: The method of example 1, wherein determining to use the reduced number of antennas for reception of the multicast communications than the number of antennas used for unicast reception comprises: receiving one or more multicast-specific assistance metrics corresponding to the multicast bandwidth part configuration; and determining to use the reduced number of antennas for reception of the multicast communications based at least in part on the one or more multicast-specific assistance metrics.

Example 3: The method of any of examples 1 or 2, wherein receiving the one or more multicast-specific assistance metrics comprises: receiving the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

Example 4: The method of any of examples 1 to 3, wherein the one or more multicast-specific assistance metrics comprise a maximum target modulation and coding scheme, a minimum physical downlink control channel aggregation level, or a combination thereof.

Example 5: The method of any of examples 1 to 4, wherein the one or more multicast-specific assistance metrics comprise an allowed modulation and coding scheme range for a time period, an allowed physical downlink control channel aggregation level range for the time period, or a combination thereof.

Example 6: The method of any of examples 1 to 5, wherein the one or more multicast-specific assistance metrics comprise a signal quality threshold, wherein the signal quality threshold is based at least in part on a reference signal received power, a reference signal received quality, a layer 1 signal to interference and noise ratio, a channel state information reference signal (CSI-RS) signal to interference and noise ratio, or some combination thereof.

Example 7: The method of any of examples 1 to 6, wherein the one or more multicast-specific assistance metrics comprise a minimum channel-to-reference signal measurement ratio.

Example 8: The method of any of examples 1 to 7, further comprising: receiving updated one or more multicast-specific assistance metrics corresponding to the multicast bandwidth part configuration based at least in part on a change to the maximum number of multiple-input, multiple-output layers or a multicast data rate to be used for the multicast communications.

Example 9: The method of any of examples 1 to 8, further comprising: transmitting channel state information feedback, wherein the change to the maximum number of multiple-input, multiple-output layers or the multicast data rate to be used for the multicast communications is based at least in part on the channel state information feedback.

Example 10: The method of any of examples 1 to 9, wherein the change to the maximum number of multiple-input, multiple-output layers or the multicast data rate to be used for the multicast communications is based at least in part on a number of UEs receiving the multicast communications changing.

Example 11: The method of any of examples 1 to 10, wherein the one or more multicast-specific assistance metrics are associated with the multicast bandwidth part configuration, and wherein different one or more multicast-specific assistance metrics are associated with a second multicast bandwidth part configuration.

Example 12: The method of any of examples 1 to 11, wherein establishing the multicast link with the base station for reception of the multicast communications comprises: switching to the multicast bandwidth part configuration during a group active time period.

Example 13: The method of any of examples 1 to 12, further comprising: receiving a unicast communication contemporaneously with the multicast communications, wherein the UE uses a consistent modulation and coding scheme and aggregation level between the unicast communication and the multicast communications.

Example 14: The method of any of examples 1 to 13, further comprising: transmitting channel state information feedback associated with the multicast communications received via the reduced number of antennas on first resources that are separate from second resources identified for transmission of channel state information feedback associated with the multicast communications received at the UE using a number of antennas equal to or greater than the number of antennas used for unicast reception.

Example 15: The method of any of examples 1 to 14, further comprising: determining that the UE is able to decode the multicast communications prior to completion of a number of repetitions or retransmissions of the multicast communications; and transmitting multicast feedback associated with the multicast communications on opportunistic multicast feedback resources in between slots prior to completion of the number of repetitions or retransmissions based at least in part on the determination that the UE is able to decode the multicast communications prior to completion of the number of repetitions or retransmissions.

Example 16: The method of any of examples 1 to 15, further comprising: determining that the UE is able to decode the multicast communications prior to completion of a number of repetitions or retransmissions of the multicast communications; and transmitting multicast feedback associated with the multicast communications on unicast feedback resources prior to completion of the number of repetitions or retransmissions based at least in part on the determination that the UE is able to decode the multicast communications.

Example 17: An apparatus for wireless communications comprising a processor; memory in electronic communication with the processor; and instructions stored in the memory and executable by the processor to cause the apparatus to perform a method of any of examples 1 to 16.

Example 18: A non-transitory computer-readable medium storing code for wireless communications, the code comprising instructions executable by a processor to perform a method of any of examples 1 to 16.

Example 19: An apparatus, comprising means for performing the method of any of examples 1 to 16.

Example 20: A method for wireless communications at a base station, comprising: transmitting a multicast bandwidth part configuration for multicast communications between the base station and a plurality of user equipments (UEs); establishing a multicast link with each of the plurality of UEs for transmissions of the multicast communications; transmitting, to the plurality of UEs, one or more multicast-specific assistance metrics corresponding to the multicast bandwidth part configuration, wherein the one or more multicast-specific assistance metrics facilitate UE adjustment of the multicast bandwidth part configuration; and transmitting, to the plurality of UEs, the multicast communications in accordance with the multicast bandwidth part configuration.

Example 21: The method of example 20, wherein transmitting, to the plurality of UEs, the one or more multicast-specific assistance metrics comprises: transmitting, to the plurality of UEs, the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

Example 22: The method of example 20 or 21, wherein the one or more multicast-specific assistance metrics comprise a maximum target modulation and coding scheme, a minimum physical downlink control channel aggregation level, or a combination thereof.

Example 23: The method of any of examples 20 to 22, wherein the one or more multicast-specific assistance metrics comprise an allowed modulation and coding scheme range for a time period, an allowed physical downlink control channel aggregation level range for the time period, or a combination thereof.

Example 24: The method of any of examples 20 to 23, wherein the one or more multicast-specific assistance metrics comprise a signal quality threshold, wherein the signal quality threshold is based at least in part on a reference signal received power, a reference signal received quality, a layer 1 signal to interference and noise ratio, a channel state information reference signal (CSI-RS) signal to interference and noise ratio, or some combination thereof.

Example 25: The method of any of examples 20 to 24, wherein the one or more multicast-specific assistance metrics comprise a minimum channel-to-reference signal measurement ratio.

Example 26: The method of any of examples 20 to 25, further comprising: receiving channel state information feedback from a UE of the plurality of UEs; and transmitting updated one or more multicast-specific assistance metrics corresponding to the multicast bandwidth part configuration based at least in part on the channel state information feedback.

Example 27: The method of any of examples 20 to 26, further comprising: identifying a change in a number of UEs receiving the multicast communications; changing a maximum number of multiple-input, multiple-output layers or a multicast data rate to be used for the multicast communications based at least in part on the change; and transmitting updated one or more multicast-specific assistance metrics corresponding to the maximum number of multiple-input, multiple-output layers or the multicast data rate to be used for the multicast communications.

Example 28: The method of any of examples 20 to 27, further comprising: configuring a plurality of multicast bandwidth part configurations each with different one or more multicast-specific assistance metrics.

Example 29: The method of any of examples 20 to 28, wherein the one or more multicast-specific assistance metrics are multicast service specific.

Example 30: The method of any of examples 20 to 29, further comprising: transmitting a number of repetitions or retransmissions of the multicast communications; and receiving multicast feedback associated with the multicast communications on opportunistic multicast feedback resources in between slots prior to completion of the number of repetitions or retransmissions based at least in part on the UE being able to decode the multicast communications prior to completion of the number of repetitions or retransmissions.

Example 31: The method of any of examples 20 to 30, further comprising: transmitting a number of repetitions or retransmissions of the multicast communications; and receiving multicast feedback associated with the multicast communications on unicast feedback resources prior to completion of the number of repetitions or retransmissions based at least in part on the UE being able to decode the multicast communications prior to completion of the number of repetitions or retransmissions.

Example 32: An apparatus for wireless communications comprising a processor; memory in electronic communication with the processor; and instructions stored in the memory and executable by the processor to cause the apparatus to perform a method of any of examples 20 to 31.

Example 33: A non-transitory computer-readable medium storing code for wireless communications, the code comprising instructions executable by a processor to perform a method of any of examples 20 to 31.

Example 34: An apparatus, comprising means for performing the method of any of examples 20 to 31.

Example 35: A method for wireless communications at a user equipment (UE), comprising: receiving a multicast bandwidth part configuration for multicast communications between a base station and the UE, wherein the multicast bandwidth part configuration includes a number of repetitions or retransmissions to be used for the multicast communications; receiving the multicast communications via a multicast link with the base station; determining that the UE is able to decode the multicast communications during a first portion of the number of repetitions or retransmissions prior to a remaining portion of the number of repetitions or retransmissions; and reducing radio frequency power during the remaining portion of the number of repetitions or retransmissions based at least in part on the determination that the UE is able to decode the multicast communications prior to completion of the number of repetitions or retransmissions.

Example 36: The method of example 35, wherein determining that the UE is able to decode the multicast communications during the first portion of the number of repetitions or retransmissions comprises: successfully decoding the multicast communications during the first portion of the number of repetitions or retransmissions prior to the remaining portion of the number of repetitions or retransmissions.

Example 37: The method of example 35 or 36, wherein determining that the UE is able to decode the multicast communications during the first portion of the number of repetitions or retransmissions comprises: determining a link quality of the multicast link; and determining that the UE is able to decode the multicast communications during the first portion of the number of repetitions or retransmissions based at least in part on the link quality of the multicast link.

Example 38: The method of any of examples 35 to 37, further comprising: receiving a multicast feedback configuration that assigns multicast feedback resources interspersed with one or more repetitions or retransmissions of the number of repetitions or retransmissions.

Example 39: The method of any of examples 35 to 38, further comprising: transmitting feedback associated with the multicast communications during the remaining portion of the number of repetitions or retransmissions based at least in part on the determination that the UE is able to decode the multicast communications prior to completion of the number of repetitions or retransmissions.

Example 40: The method of any of examples 35 to 39, wherein transmitting feedback associated with the multicast communications further comprises: transmitting the feedback associated with the multicast communications on opportunistic multicast feedback resources in between slots during the remaining portion of the number of repetitions or retransmissions based at least in part on the determination that the UE is able to decode the multicast communications prior to completion of the number of repetitions or retransmissions.

Example 41: The method of any of examples 35 to 40, wherein transmitting feedback associated with the multicast communications further comprises: transmitting the feedback associated with the multicast communications on unicast feedback resources during the remaining portion of the number of repetitions or retransmissions based at least in part on the determination that the UE is able to decode the multicast communications prior to completion of the number of repetitions or retransmissions.

Example 42: The method of any of examples 35 to 41, wherein the feedback associated with the multicast communications is piggybacked with unicast feedback.

Example 43: The method of any of examples 35 to 42, wherein determining that the UE is able to decode the multicast communications during the first portion of the number of repetitions or retransmissions comprises: receiving one or more multicast-specific assistance metrics corresponding to the multicast bandwidth part configuration; and determining that the UE is able to decode the multicast communications during the first portion of the number of repetitions or retransmissions based at least in part on the one or more multicast-specific assistance metrics.

Example 44: The method of any of examples 35 to 43, wherein receiving the one or more multicast-specific assistance metrics comprises: receiving the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

Example 45: The method of any of examples 35 to 44, wherein the one or more multicast-specific assistance metrics comprise a maximum target modulation and coding scheme, a minimum physical downlink control channel aggregation level, or a combination thereof.

Example 46: The method of any of examples 35 to 45, wherein the one or more multicast-specific assistance metrics comprise an allowed modulation and coding scheme range for a time period, an allowed physical downlink control channel aggregation level range for the time period, or a combination thereof.

Example 47: The method of any of examples 35 to 46, wherein the one or more multicast-specific assistance metrics comprise a signal quality threshold, wherein the signal quality threshold is based at least in part on a reference signal received power, a reference signal received quality, a layer 1 signal to interference and noise ratio, a channel state information reference signal (CSI-RS) signal to interference and noise ratio, or some combination thereof.

Example 48: The method of any of examples 35 to 47, wherein the one or more multicast-specific assistance metrics comprise a minimum channel-to-reference signal measurement ratio.

Example 49: An apparatus for wireless communications comprising a processor; memory in electronic communication with the processor; and instructions stored in the memory and executable by the processor to cause the apparatus to perform a method of any of examples 35 to 48.

Example 50: A non-transitory computer-readable medium storing code for wireless communications, the code comprising instructions executable by a processor to perform a method of any of examples 35 to 48.

Example 51: An apparatus, comprising means for performing the method of any of examples 35 to 48.

Example 52: A method for wireless communications at a base station, comprising: transmitting a multicast bandwidth part configuration for multicast communications between the base station and a plurality of user equipments (UEs), wherein the multicast bandwidth part configuration includes a number of repetitions or retransmissions to be used for the multicast communications; transmitting, to the plurality of UEs, one or more multicast-specific assistance metrics corresponding to the multicast bandwidth part configuration, wherein the one or more multicast-specific assistance metrics facilitate early UE power-down prior to completion of the number of repetitions or retransmissions; and transmitting the multicast communications via a multicast link with each of the plurality of UEs in accordance with the multicast bandwidth part configuration.

Example 53: The method of example 52, further comprising: transmitting a multicast feedback configuration that assigns multicast feedback resources interspersed with one or more repetitions or retransmissions of the number of repetitions or retransmissions.

Example 54: The method of example 52 or 53, further comprising: receiving feedback associated with the multicast communications prior to completion of the number of repetitions or retransmissions.

Example 55: The method of any of examples 52 to 54, wherein receiving feedback associated with the multicast communications prior to completion of the number of repetitions or retransmissions further comprises: receiving the feedback associated with the multicast communications on opportunistic multicast feedback resources in between slots of the number of repetitions or retransmissions.

Example 56: The method of any of examples 52 to 55, wherein receiving feedback associated with the multicast communications prior to completion of the number of repetitions or retransmissions further comprises: receiving the feedback associated with the multicast communications on unicast feedback resources prior to completion of the number of repetitions or retransmissions.

Example 57: The method of any of examples 52 to 56, wherein the feedback associated with the multicast communications is piggybacked with unicast feedback.

Example 58: The method of any of examples 52 to 57, wherein transmitting, to the plurality of UEs, the one or more multicast-specific assistance metrics comprises: transmitting, to the plurality of UEs, the one or more multicast-specific assistance metrics via a multicast wake signal, a multicast bandwidth part switching command, a physical downlink control channel scheduling multicast message, a medium access control-control element in a multicast physical downlink shared channel, a multicast control channel, or a combination thereof.

Example 59: The method of any of examples 52 to 58, wherein the one or more multicast-specific assistance metrics comprise a maximum target modulation and coding scheme, a minimum physical downlink control channel aggregation level, or a combination thereof.

Example 60: The method of any of examples 52 to 59, wherein the one or more multicast-specific assistance metrics comprise an allowed modulation and coding scheme range for a time period, an allowed physical downlink control channel aggregation level range for the time period, or a combination thereof.

Example 61: The method of any of examples 52 to 60, wherein the one or more multicast-specific assistance metrics comprise a signal quality threshold, wherein the signal quality threshold is based at least in part on a reference signal received power, a reference signal received quality, a layer 1 signal to interference and noise ratio, a channel state information reference signal (CSI-RS) signal to interference and noise ratio, or some combination thereof.

Example 62: The method of any of examples 52 to 61, wherein the one or more multicast-specific assistance metrics comprise a minimum channel-to-reference signal measurement ratio.

Example 63: An apparatus for wireless communications comprising a processor; memory in electronic communication with the processor; and instructions stored in the memory and executable by the processor to cause the apparatus to perform a method of any of examples 52 to 62.

Example 64: A non-transitory computer-readable medium storing code for wireless communications, the code comprising instructions executable by a processor to perform a method of any of examples 52 to 62.

Example 65: An apparatus, comprising means for performing the method of any of examples 52 to 62.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
    a processor,
    memory coupled with the processor; and
    instructions stored in the memory and executable by the processor to cause the apparatus to:
        receive a configuration for multicast communications between a network device and the UE, wherein the configuration indicates a maximum number of multiple-input, multiple-output layers to be used for the multicast communications; and
        receive the multicast communications based at least in part on the maximum number of multiple-input, multiple-output layers.

2. The apparatus of claim 1, wherein the configuration for multicast communications indicates one or more multicast-specific assistance metrics associated with a modulation and coding scheme, an aggregation level, a signal quality threshold, a physical downlink shared channel (PDSCH)-to-reference signal ratio for the multicast communications, or any combination thereof.

3. The apparatus of claim 2, wherein the instructions are further executable by the processor to cause the apparatus to:
    establish a multicast link with the network device for reception of the multicast communications based at least in part on the one or more multicast-specific assistance metrics and the maximum number of multiple-input, multiple-output layers.

4. The apparatus of claim 1, wherein the instructions are further executable by the processor to cause the apparatus to:
    determine, based at least in part on a link quality of a multicast link with the network device for reception of the multicast communications, to use a reduced quantity of antennas for reception of the multicast communications.

5. The apparatus of claim 4, wherein the reduced quantity of antennas is reduced relative to a number of antennas used for unicast communications.

6. The apparatus of claim 4, wherein the instructions are further executable by the processor to cause the apparatus to:
    receive an indication that identifies a maximum target modulation and coding scheme and a minimum aggregation level for the multicast communications, wherein the reduced quantity of antennas is based at least in part on the indication.

7. The apparatus of claim 4, wherein the instructions are further executable by the processor to cause the apparatus to:
    transmit channel state information feedback comprising an indication of a reduced modulation and coding scheme.

8. The apparatus of claim 1, wherein the instructions are further executable by the processor to cause the apparatus to:
    receive one or more updated multicast-specific assistance metrics corresponding to the configuration for multicast communications based at least in part on channel state information feedback or a change in link quality of a multicast link with the network device for reception of the multicast communications.

9. The apparatus of claim 1, wherein the configuration is received in a physical downlink shared channel.

10. A method for wireless communications at a user equipment (UE), comprising:
    receiving a configuration for multicast communications between a network device and the UE, wherein the configuration indicates a maximum number of multiple-input, multiple-output layers to be used for the multicast communications; and
    receiving the multicast communications based at least in part on the maximum number of multiple-input, multiple-output layers.

11. The method of claim 10, wherein the configuration for multicast communications indicates one or more multicast-specific assistance metrics associated with a modulation and coding scheme, an aggregation level, a signal quality threshold, a physical downlink shared channel (PDSCH)-to-reference signal ratio for the multicast communications, or any combination thereof.

12. The method of claim 11, further comprising:
    establishing a multicast link with the network device for reception of the multicast communications based at least in part on the one or more multicast-specific assistance metrics and the maximum number of multiple-input, multiple-output layers.

13. The method of claim 10, further comprising:
    determining, based at least in part on a link quality of a multicast link with the network device for reception of the multicast communications, to use a reduced quantity of antennas for reception of the multicast communications.

14. The method of claim 13, wherein the reduced quantity of antennas is reduced relative to a number of antennas used for unicast communications.

15. The method of claim 13, further comprising:
    receiving an indication that identifies a maximum target modulation and coding scheme and a minimum aggregation level for the multicast communications, wherein the reduced quantity of antennas is based at least in part on the indication.

16. The method of claim 13, further comprising:
    transmitting channel state information feedback comprising an indication of a reduced modulation and coding scheme.

17. The method of claim 10, further comprising:
    receiving one or more updated multicast-specific assistance metrics corresponding to the configuration for multicast communications based at least in part on channel state information feedback or a change in link quality of a multicast link with the network device for reception of the multicast communications.

18. The method of claim 10, wherein the configuration is received in a physical downlink shared channel.

19. An apparatus for wireless communications at a user equipment (UE), comprising:
means for receiving a configuration for multicast communications between a network device and the UE, wherein the configuration indicates a maximum number of multiple-input, multiple-output layers to be used for the multicast communications; and
means for receiving the multicast communications based at least in part on the maximum number of multiple-input, multiple-output layers.

20. The apparatus of claim 19, wherein the configuration for multicast communications indicates one or more multicast-specific assistance metrics associated with a modulation and coding scheme, an aggregation level, a signal quality threshold, a physical downlink shared channel (PDSCH)-to-reference signal ratio for the multicast communications, or any combination thereof.

21. The apparatus of claim 20, further comprising:
means for establishing a multicast link with the network device for reception of the multicast communications based at least in part on the one or more multicast-specific assistance metrics and the maximum number of multiple-input, multiple-output layers.

22. The apparatus of claim 19, further comprising:
means for determining, based at least in part on a link quality of a multicast link with the network device for reception of the multicast communications, to use a reduced quantity of antennas for reception of the multicast communications.

23. The apparatus of claim 22, wherein the reduced quantity of antennas is reduced relative to a number of antennas used for unicast communications.

24. The apparatus of claim 22, further comprising:
means for receiving an indication that identifies a maximum target modulation and coding scheme and a minimum aggregation level for the multicast communications, wherein the reduced quantity of antennas is based at least in part on the indication.

25. The apparatus of claim 22, further comprising:
means for transmitting channel state information feedback comprising an indication of a reduced modulation and coding scheme.

26. The apparatus of claim 19, further comprising:
means for receiving one or more updated multicast-specific assistance metrics corresponding to the configuration for multicast communications based at least in part on channel state information feedback or a change in link quality of a multicast link with the network device for reception of the multicast communications.

27. The apparatus of claim 19, wherein the configuration is received in a physical downlink shared channel.

28. A non-transitory computer-readable medium storing code for wireless communication at a user equipment (UE), the code comprising instructions executable by a processor to:
receive a configuration for multicast communications between a network device and the UE, wherein the configuration indicates a maximum number of multiple-input, multiple-output layers to be used for the multicast communications; and
receive the multicast communications based at least in part on the maximum number of multiple-input, multiple-output layers.

29. The non-transitory computer-readable medium of claim 28, wherein the configuration for multicast communications indicates one or more multicast-specific assistance metrics associated with a modulation and coding scheme, an aggregation level, a signal quality threshold, a physical downlink shared channel (PDSCH)-to-reference signal ratio for the multicast communications, or any combination thereof.

30. The non-transitory computer-readable medium of claim 29, wherein the instructions are further executable by the processor to:
establish a multicast link with the network device for reception of the multicast communications based at least in part on the one or more multicast-specific assistance metrics and the maximum number of multiple-input, multiple-output layers.

* * * * *